(12) United States Patent
Vladimirskiy et al.

(10) Patent No.: US 12,273,245 B2
(45) Date of Patent: *Apr. 8, 2025

(54) SCALABLE, STANDARDIZED I.T. DEPLOYMENT PLATFORM

(71) Applicant: Nerdio, Inc., Skokie, IL (US)

(72) Inventors: Vadim Vladimirskiy, Chicago, IL (US); Amol Dalvi, Irvine, CA (US); George Malec, Chicago, IL (US)

(73) Assignee: Nerdio, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,083

(22) Filed: Aug. 7, 2023

(65) Prior Publication Data

US 2023/0379228 A1    Nov. 23, 2023

Related U.S. Application Data

(63) Continuation of application No. 17/671,192, filed on Feb. 14, 2022, now Pat. No. 11,722,385, which is a continuation of application No. 16/925,319, filed on Jul. 9, 2020, now Pat. No. 11,252,050, which is a continuation of application No. 15/951,163, filed on Apr. 11, 2018, now Pat. No. 10,715,403.

(60) Provisional application No. 62/484,179, filed on Apr. 11, 2017.

(51) Int. Cl.
| | |
|---|---|
| *H04L 41/5054* | (2022.01) |
| *G06F 9/50* | (2006.01) |
| *G06Q 10/0631* | (2023.01) |
| *H04L 41/08* | (2022.01) |
| *H04L 41/0806* | (2022.01) |
| *H04L 41/082* | (2022.01) |
| *H04L 43/50* | (2022.01) |

(52) U.S. Cl.
CPC ......... *H04L 41/5054* (2013.01); *G06F 9/505* (2013.01); *G06F 9/5077* (2013.01); *G06Q 10/06313* (2013.01); *H04L 41/0806* (2013.01); *H04L 41/0886* (2013.01); *H04L 43/50* (2013.01); *H04L 41/082* (2013.01)

(58) Field of Classification Search
None
See application file for complete search history.

(56) References Cited

U.S. PATENT DOCUMENTS

| | | | | |
|---|---|---|---|---|
| 10,069,680 | B1* | 9/2018 | Wylie | H04L 41/40 |
| 11,354,150 | B1* | 6/2022 | Guo | H04L 41/082 |
| 2009/0276771 | A1* | 11/2009 | Nickolov | G06Q 30/04 |
| | | | | 718/1 |
| 2011/0154320 | A1* | 6/2011 | Verma | H04W 4/60 |
| | | | | 718/1 |

(Continued)

*Primary Examiner* — Scott B Christensen
(74) *Attorney, Agent, or Firm* — K&L Gates LLP

(57) ABSTRACT

The present disclosure provides a scalable, standardized IT deployment environment that allows for deployment to any public or private cloud automatically, and that is resizable such that the individual resources can be released ("turned off") when not needed and powered on when use is expected. Additionally, the present disclosure provides a cost calculation system for better understanding the costs of the IT environment as early as the pre-provisioning stage. The present disclosure also provides a system for proactively testing productivity and efficiency within the IT environment, the results of which can be fed back into the autoscaling mechanism.

20 Claims, 16 Drawing Sheets

(56) References Cited

U.S. PATENT DOCUMENTS

| | | | |
|---|---|---|---|
| 2014/0026122 A1* | 1/2014 | Markande | G06F 11/3688 |
| | | | 717/124 |
| 2014/0059228 A1* | 2/2014 | Parikh | H04L 67/1012 |
| | | | 709/226 |
| 2014/0068335 A1* | 3/2014 | Bromley | H04L 43/50 |
| | | | 714/E11.177 |
| 2014/0201357 A1* | 7/2014 | Tang | H04L 43/50 |
| | | | 709/224 |
| 2015/0295792 A1* | 10/2015 | Cropper | H04L 67/10 |
| | | | 709/226 |
| 2019/0095232 A1* | 3/2019 | Okuno | G06F 9/45558 |
| 2020/0257554 A1* | 8/2020 | Okuno | G06F 9/5077 |

* cited by examiner

MANAGE DESKTOP AUTO-SCALE

400

DESKTOP AUTO-SCALE [ON] — 402

Estimated savings of desktop compute resources (up to): 57%

AUTO-SCALE USER PROFILES — 404

| NAME | WORK HOURS | USERS | |
|---|---|---|---|
| Workaholic — 408<br>Users that want their desktops to be available 24x7. | 12:00 am to 12:00 am CT<br>Monday - Sunday<br>24 hours a day, 7 days a week | 0 | [Edit] — 406 |
| Productivity — 410<br>Users that need their desktops outside of regular business hours. | 06:00 am to 09:00 pm CT<br>Monday - Saturday<br>15 hours a day, 6 days a week | 3 | [Edit] — 406 |
| Work/Life balance — 412<br>Users that need their desktops during regular business hours only. | 08:00 am to 06:00 pm CT<br>Monday - Friday<br>10 hours a day, 5 days a week | 5 | [Edit] — 406 |

VM SIZING ACTION PLANS

| NAME | DESCRIPTION | BASELINE VM SIZE | |
|---|---|---|---|
| RDSH01 | RDS Session Host | D1v2 (1C/3.5GB) | [View plan] — 425 |
| WSx | All VDI Desktops | | VDI desktops will be stopped after work hours and started up before work hours. |

FIG. 4A

EDIT DESKTOP AUTO-SCALE PROFILE

NAME
Productivity

WORK DAYS
Monday - Saturday    6 days
  418                 424

DESCRIPTION
Users that need their desktops outside of regular business hours.    416

WORK HOURS (CT)
6 a.m.   to   9 p.m.    15 hours
 420           422

USERS
[Chad CEO] [Sally Sales] [Amol Dalvi]

Note: If user is currently associated with another profile, then user will be disassociated from that profile and associated with this profile.

[Cancel] [Save]

| SERVER | INSTANCE SIZE | OS DISK | DATA DISK | | |
|---|---|---|---|---|---|
| Server #1 | D1v2 (1C/3.5GB/SSD) ▾ | P10 (128 GB SSD) ▾ | P10 (128 GB SSD) ▾ | Delete | Add another |
| | 524 | 526 | 528 | | |

③ OFFICE 365 AND RDS

How many Office 365 E3 licenses will you sell to customer? [100] 506

Will you purchase RDS licenses for customer under the SPLA agreement? ● Yes ○ No 508

④ OTHER FEATURES
Will you be taking advantage of these other features?

| FEATURE | DESCRIPTION | |
|---|---|---|
| Hybrid Usage Benefit (HUB) | Take advantage of Azure's Hybrid Usage Benefit (HUB) | ○ Yes ● No |
| Desktop auto-scale | Automatically scale down/up desktop compute to reduce costs | ○ Yes ● No |
| In-region backup | Backup all servers and desktops on a nightly basis | ○ Yes ● No |
| Reserved instances | Reduce compute costs with reserved instances from Azure | ● 3 years ○ 1 year ○ No |
| Out-of-region DR | DR replication to another Azure region | ○ Yes ● No |
| On-ramp regions | Allow users to connect to Azure from a region closest to them | ○ Yes ● No |
| Performance monitoring | End-user experience monitoring | ○ Yes ● No |

FIG. 5B

⑤ COST ASSUMPTIONS 510

There are a handful of cost assumptions we make in our calculations. Pricing is based on East US region prices. Feel free to change any of the following assumptions.

| ITEM | DESCRIPTION | COSTS | |
|---|---|---|---|
| Bandwidth 548 | Estimated bandwidth usage for RDP connection, per-user-per-month. Typically it's $1.00 for regular users and it's $3.00 for graphically intensive users. | $ 1.50 | per user per month |
| Storage access 550 | Estimated standard storage usage per user. For HDD transactions only, does not apply to SSD. | $ 0.70 | per user per month |
| Users to CPU Core ratio (RDSH) 552 | Average number of users per CPU core of standard RDS session host. | 5 | |
| Users to CPU Core ratio (RDSH with GPU) 554 | Average number of users per CPU core of a GPU-enabled RDS session host. | 2.5 | |
| Azure CSP discount 556 | Discount available to you as a Microsoft partner for Azure resources. | 15 | % |
| Office 365 CSP discount 558 | Discount available to you as a Microsoft partner for Office 365 licenses. | 20 | % |
| Azure region 560 | Azure pricing can vary by region. We do not allow you to select a different region for cost estimates at this time. | East US ▼ | |
| Currency 562 | Show costs in selected currency | USD ▼ | |

View costs

FIG. 5C

| VM | INSTANCE SIZE | OS DISK | DATA DISK |
|---|---|---|---|
| AD domain controller | D1v2 (1C/3.5GB/SSD) | P10 (128 GB SSD) | |
| File server | D1v2 (1C/3.5GB/SSD) | P10 (128 GB SSD) | P10 (128 GB SSD) |
| ADFS Proxy | D1v2 (1C/3.5GB/SSD) | S10 (128 GB HSD) | |
| Server #1 | D1v2 (1C/3.5GB/SSD) | P10 (128 GB SSD) | P10 (128 GB SSD) |
| RD Gateway #1 | D1v2 (1C/3.5GB/SSD) | P10 (128 GB SSD) | |
| RDSH #1 | D16v3 (16C/64GB/SSD) | P10 (128 GB SSD) | |
| RDSH #2 | D2v3 (2C/8GB/SSD) | P10 (128 GB SSD) | |
| VDI Desktops (10) | D1v2 (1C/3.5GB/SSD) | P10 (128 GB SSD) | |

AZURE COSTS BREAKDOWN 600

606

$1,280 ~650

Estimate only. All costs listed on this page are per month. Actual costs may vary depending on usage, price changes and other factors.

| | | | |
|---|---|---|---|
| Desktops | $1,027 | Bandwidth 652 | $150 |
| Desktop auto-scale savings | - | Disaster Recovery | - |
| Server compute | $179 | Performance monitoring | - |
| Server storage | $125 | On-ramp regions | - |
| Backup | - | Storage access (HDD transactions) | - |
| Users per RDS host CPU core | 5 | Users per RDS host (with GPU) CPU core | 2.5 |
| Azure CSP discount | 15% | Other (IP addresses, VPN, Automation) | $27 |
| Azure region | East US | Azure Hybrid Usage Benefit enabled | No |

Note: Office 365 costs include Office 365 CSP discount of 20%.

Back  Print

FIG. 6C

SCALABLE, STANDARDIZED I.T. DEPLOYMENT PLATFORM

CROSS-REFERENCE TO PRIOR APPLICATIONS

The present application is a continuation of which is a continuation of U.S. application Ser. No. 17/671,192 filed on Feb. 14, 2022, which is a continuation of U.S. application Ser. No. 16/925,319 filed Jul. 9, 2020, which is a continuation of U.S. application Ser. No. 15/951,163 filed Apr. 11, 2018, which claims the benefit of priority to U.S. Provisional Application No. 62/484,179 filed Apr. 11, 2017, the entireties of which are incorporated herein by reference.

BACKGROUND OF THE INVENTION

The present subject matter relates generally to scalable, standardized IT deployment environment. More specifically, the present invention relates to an IT environment deployed to a public or private cloud automatically, without human interaction, and is resizable such that the resources can be automatically released ("turned off") when not needed and powered on when use is expected.

Deploying an IT environment, especially one that includes virtual desktops, on a public or private cloud is a complex and manual process that involves integration of multiple components from different vendors. The process is susceptible to errors due to the significant human element involved. The process is also time consuming and expensive. Deploying the same IT environment to one cloud (e.g., Microsoft Azure) can be drastically different from another cloud (e.g., Amazon AWS) due to the nuances of each platform, available APIs and hardware limitations.

Much of the complexity stems from the multitude (thousands) of design choices that have to be made during the provisioning process. Each of these choices can have a cascade effect where, if an early choice is reconsidered, the entire environment may need to be re-created. Maintaining and supporting these environments is challenging because of the unique, "one-off" nature of each one. Engineers must maintain detailed documentation on each deployment and always be cognizant of all the nuances for each implementation. Troubleshooting often requires an experienced engineer who understand the entire package.

The current state of the art is problematic because resources are not efficiently allocated for either server-side providers or end users. The use of "rented" (e.g., Public cloud, collocation space, etc.) infrastructure to host IT systems often results in inefficient spend. This is true because most workloads are non-uniformly distributed across the hours of the day and days of week. For example, a hosted user desktop will be used during normal business hours of 9-5 on weekdays and not used during other times of the week. In this case, the hosted computer is being utilized 24% of the time, but, since it's dedicated to the "renter" of infrastructure (meaning it's not available to be used by anyone else that's a client of the provider), the cost of the computer is calculated as if it were being used 100% of the time.

The inefficient allocation of computing capacity results in a waste of provider resources, since even when the computer is not being used it sits idle and cannot be used by others, and, more importantly, it results in a waste of the customer's money, since the benefit is only derived for a fraction of the time for which the customer is paying.

Previous attempts to address this problem have been made, but the use cases for when these solutions could be effectively implemented have been limited. For example, previous systems typically assumed that there were many (sometimes hundreds or thousands) of users of identical desktops during work hours and fewer users that used their desktops during off hours. These previous systems turned off some of the identical servers during off hours as the load decreased and turned the servers back on during work hours as the load on the system increased.

The major limitation of this previous approach is that it only worked when each user had a desktop that was identical to a significant number of other users, which is unrealistic in today's workplace environment. Although this previous approach provided flexibility, because the system could meet resource demands by serving a random desktop to the user out of a pool of identical desktops at any time, and because the size of the desktop pool could be adjusted by shutting down some of its resources (i.e., server hosts). It could not address needs in which each user has a customized desktop environment.

However, in most workplace environments, users' desktops are persistent. This means that each user's desktop is customized to that user with specific applications, data, settings, and preferences. Each user's desktop may also vary in terms of power (e.g., CPU, RAM hard drive space, etc.). Since persistent desktops cannot be used interchangeably between users, the previous systems that scale groups of identical desktop resources do not solve the problem.

In addition to the problems expressed above, previous systems had difficulty in accurately estimating the true system costs prior to implementation. Estimating the actual costs of provisioning a complete IT environment can be pretty complex; in fact, many managed service providers (MSPs) don't have a real grasp on the numbers until after they deploy the system. Using previously existing calculators, it may not have been easy to compile all of the inputs needed in order to make the output accurate. For example, while it may be obvious to include direct costs of the virtual environment, it might be easy to overlook the necessary software licenses and similar add on costs, including the costs associated with remote desktop servers (RDS) and client access licenses (CAL), which are required in order to properly connect to a remote desktop session host server. Another often overlooked but important aspect in estimating costs is the "plumbing," including expenses such as bandwidth, disk I/O, and storage costs. Beyond the foundational expenses, there are often a number of ancillary capabilities built in to virtual environments, such as reserved virtual machine instances, which allow you to reserve virtual machines for a one- or three-year period for greater price predictability and cost savings.

Previous systems have also fallen short in their delivery of performance monitoring and testing. The loss of productivity and loss of efficiency caused by IT latencies are real-world problems. So many organizations rely on their employees' ability to rapidly and reliably access email, applications, web, and other business-critical IT components. Any problems in these areas can be a huge blow to productivity, especially without an intelligent performance monitoring solution in place. Without proactive monitoring, businesses can spend more time troubleshooting and trying to pinpoint problems than actually problem solving.

Accordingly, there is a need for scalable, standardized IT deployment environment that allows for deployment to any public or private cloud automatically, and without human interaction, that is resizable such that the individual resources can be released ("turned off") when not needed and powered on when use is expected, as described herein. Further, there is a need for accurate cost calculation and proactive productivity and efficiency testing, also as described herein.

BRIEF SUMMARY OF THE INVENTION

To meet the needs described above and others, the present disclosure provides a scalable, standardized IT deployment environment that allows for deployment to any public or private cloud automatically, and without human interaction, that is resizable such that the individual resources can be released ("turned off") when not needed and powered on when use is expected. Additionally, the present disclosure provides a cost calculation system for better understanding the costs of the IT environment as early as the pre-provisioning stage. The present disclosure also provides a system for proactively testing productivity and efficiency within the IT environment, the results of which can be fed back into the autoscaling mechanism.

One aspect of the system described herein is an automated cloud-based IT provisioning platform. By providing an automatic provisioning platform, the system is able to significantly decrease the amount of time required to engineer and implement a cloud-based IT platform. In typical workplace environments, the setup time can be reduced from a number of weeks to a number of hours. Additionally, the system helps to eliminate the human-error element of building an IT system, reduces mistakes, and provides consistency across installations and across use-cases by automatically making a multitude of design choices on behalf of the IT administrator using industry best-practices.

One advantage of this aspect of the system is that it substantially reduces the need for human involvement, which is often costly and time consuming. Moreover, the system allows for a unified installation process, which eliminates the incompatibilities or required modifications often required when installing services for a singular IT environment. The system does so by systematically drawing resources from one or more of several cloud-based platforms including, for example, Microsoft Azure and Amazon AWS.

Another aspect of the system described herein is a unique scaling mechanic, referred to herein as an autoscaling mechism. The autoscaling mechism looks at the expected usage of any one particular resource (e.g., persistent desktop) and releases individual resources (i.e., powers each resource off) when no usage is expected, powers each resource on when full usage is expected, and, most importantly, resizes resources shared by multiple users when expected usage is somewhere between no usage and full usage. Since the autoscaling mechanism looks at expected usage of each and every resource individually, it is able to handle persistent desktop scenarios, which are the most prevalent use-case in the real world and, because it enables scaling, it is able to more closely match resource size to demand when compared to systems that simply turn off/on their resources.

The autoscaling mechism is mutually beneficial for both end user and server provider. In one contemplated embodiment, the end user employing the IT platform does not have to pay for the server space during no-usage periods, while the server provider does not have to allocate their usual resources to the IT platform. As a result, the user enjoys the benefit of not paying for services not being used and the server provider enjoys the benefit of being able to make greater utilization of its resources. In certain environments, such as when used in combination with Microsoft Azure with RDS desktops, the autoscaling mechism system allows for significant savings to the end user by automatically shutting down and sizing down (i.e., using some, but less than all of the resources available) virtual machines during hours of lower user demand.

As noted, the provisioning of an IT environment is a complex task with numerous interconnected steps. As a result, estimating the actual costs of provisioning the entire IT environment can be pretty complex; in fact, many managed service providers (MSPs) find it difficult to calculate the true costs of the IT environment until after it is provisioned and deployed (and invoiced). The cost calculator taught herein estimates the costs of provisioning and running a cloud-based IT environment taking into account all of the relevant costs. In addition, it provides real-time costs as users enter various data points, which allows user to create "what-if?" scenarios to explore options for provisioning the IT environment. Further, the cost calculator can generate cost information in multiple currencies and provide the per user per month in addition to generating a total monthly or annual cost.

Another aspect of the subject matter presented herein is a system and method for testing the IT environment. In a preferred embodiment, the IT environment testing method uses visual synthetic monitoring to mimic end-user interaction flows in the IT environment to test key dimension of the user experience. This user-centric approach is meaningful in that is focused on what the user experiences and perceives as performance.

In a primary example used herein, the IT environment testing method automatically performs tests for key dimensions of the user experience on an hourly basis and reports the response times for each type of service. In one example, these tests include: logging in to the desktop, visiting a website using a primary web browser, visiting a website using a secondary web browser, sending an email via an email client, opening a word-processing document, opening a presentation software document, and opening a PDF document.

The results of these timed tests can be classified based on performance against benchmark metrics. For example, IT administrators can customize thresholds for each of these tests against which the testing method will report service as good, fair, or poor. It is understood that numerous variations for the scoring and reporting may be implemented based on the teachings provided herein.

This advanced end-user testing provides more meaningful feedback because it measures actual, real-time performance where it really counts. Not only does this enable IT administrators to be proactive and prevent issues before they derail the organization, but the data compiled in the testing method may be used to feed informative data points into the autoscaling method, which in turn enables dynamic and automated scaling of computer resources based on measured real usage trends.

The IT environment testing method helps to solve real-world problems including loss of productivity and efficiency due to IT latencies. So many organizations rely on their employees' ability to rapidly and reliably access email, applications, web, and other business-critical IT components. Any problems in these areas are a huge blow to productivity. Without proactive monitoring, administrators may spend more time troubleshooting and trying to pinpoint problems than actually fixing the problems.

In a first example, a system that automatically scales a scalable resource in an IT environment includes: a scalable resource having a plurality of incrementally scalable sizes, wherein each size is defined by comprising a number of CPU cores and a first amount of RAM; a server including a controller controlling the size of the resource; a memory coupled to the controller, wherein the memory is configured to store program instructions executable by the controller; wherein, in response to executing the program instructions, the controller is configured to: receive a baseline size of the scalable resource supporting a first number of users including a first number of CPU cores and a first amount of RAM; receive a request to resize the resource to a new size supporting a new number of users; in response to the request to resize the resource, and without user intervention, using a users to core ratio, wherein the users to core ratio is defined as the number of users that can be supported per CPU core, calculate a minimum number of CPU cores needed to support the new size by multiplying the users to core ratio by the new number of users; in response to the request to resize the resource, and without user intervention, using a RAM to core ratio, wherein the RAM to core ratio is defined as the amount of RAM that is needed per CPU core, calculate an amount of RAM needed for the new size by multiplying the RAM to core ratio by the number of CPU cores needed to support the new number of users; in response to the calculation of CPU cores and the calculation of RAM, and without user intervention, identify one of the plurality of incrementally scalable sizes for the resource that comprises at least the minimum number of CPU cores needed to support the new number of users and at least the amount of RAM needed for the new size; in response to identifying the one of the plurality of incrementally scalable sizes for the scalable resource, and without user intervention, resize the scalable resource to the identified one of the plurality of incrementally scalable sizes for the scalable resource.

In some embodiments, the request to resize the scalable resource to the new size supporting the new number of users is derived from an action plan comprising a schedule of a plurality of users scheduled to access the scalable resource at any given time. The action plan may be automatically generated by a composition of a plurality of work hours profiles, each work hours profile comprising a user adjustable schedule of when an associated user is expected to use the scalable resource. Each of the work hours profile may be adjustable through a user adjustable graphical user interface.

The request to resize the resource to a new size supporting the new number of users may be triggered by the output of a testing server.

The output of the testing server may automatically adjust an action plan comprising a schedule of a plurality of users scheduled to access the scalable resource at any given time, and the request to resize the scalable resource to a new size supporting the new number of users is derived from the action plan.

The output of the testing server may automatically adjust at least one work hours profile comprising a user adjustable schedule of when an associated user is expected to use the scalable resource, wherein the adjustment of the at least one work hours profile modifies an action plan comprising a schedule of a plurality of users scheduled to access the scalable resource at any given time, and the request to resize the scalable resource to a new size supporting the new number of users is derived from the action plan.

The system may further include: a second scalable resource having a plurality of incrementally scalable sizes, wherein each size is defined by comprising a number of CPU cores and an amount of RAM; wherein, in response to executing the program instructions, the controller is configured to: receive a baseline size of the second scalable resource supporting a second number of users including a second number of CPU cores and a second amount of RAM; receive a request to resize the resource to a second new size supporting a second number of users; in response to the request to resize the resource, and without user intervention, using the users to core ratio, calculate a minimum number of CPU cores needed to support the second new size by multiplying the users to core ratio by the second new number of users; in response to the request to resize the resource, and without user intervention, using the RAM to core ratio, calculate an amount of RAM needed for the second new size by multiplying the RAM to core ratio by the number of CPU cores needed to support the second new number of users; in response to the calculation of CPU cores and the calculation of RAM, and without user intervention, identify one of the plurality of incrementally scalable sizes for the resource that comprises at least the minimum number of CPU cores needed to support the second new number of users and at least the amount of RAM needed for the second new size; in response to identifying the one of the plurality of incrementally scalable sizes for the second scalable resource, and without user intervention, resize the second scalable resource to the identified one of the plurality of incrementally scalable sizes for the second scalable resource.

The system may further comprise a non-scalable resource, wherein the request to resize the scalable resource to the new size supporting the new number of users is derived from an action plan comprising a schedule of a plurality of users scheduled to access the scalable resource at any given time and the action plan includes a schedule for turning on and off the non-scalable resource.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 4A-4C illustrate a representative example of an autoscaling GUI.

FIGS. 5A-5C illustrate an example of an IT environment provisioning cost calculator GUI.

FIGS. 6A-6C illustrate an example of an IT environment provisioning cost calculator output GUI.

DETAILED DESCRIPTION OF THE INVENTION

The following detailed description provides examples of implementations of the present subject matter, including descriptions of systems and methods for: (1) provisioning an IT environment in a public or private cloud without human intervention; (2) automatically scaling each of the resources within the provisioned IT environment (i.e., individual resources automatically power on and power off and shared resources automatically resize) to optimize resource usage within the system; (3) calculating post-provisioning and deployment costs of the IT environment at the pre-provisioning and pre-deployment stage; and (4) proactive productivity and efficiency testing within the IT environment.

In the primary embodiment described herein, each of the features and functions is provided via a unified IT automation platform. However, it is understood that each of the features and functions described herein may alternatively be provided as one or more standalone systems. Similarly, it may be advantageous to provide systems embodying one or more sub-combinations of the features and functions described herein.

Figure 1A:
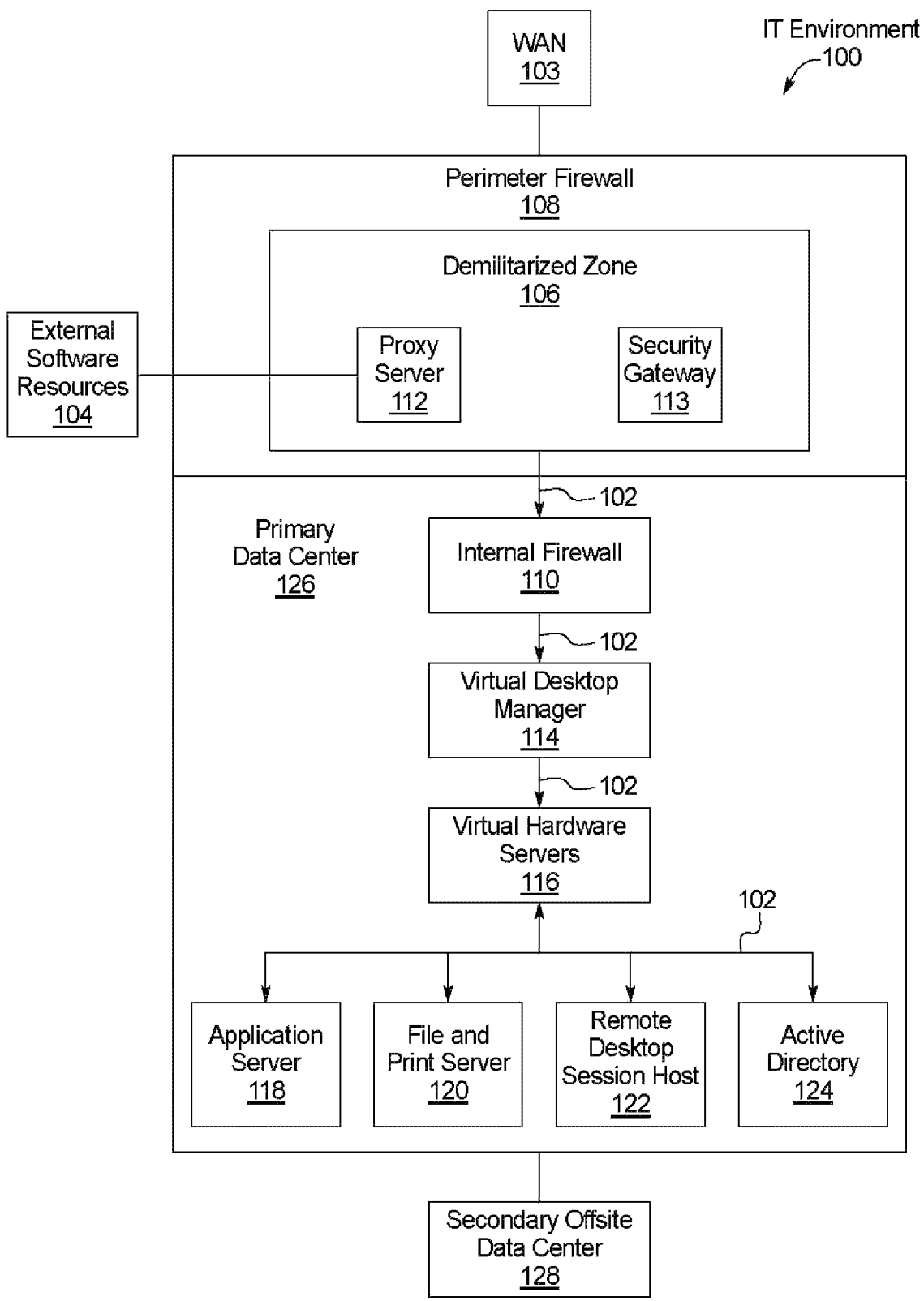
FIG. 1A is an example of a private cloud hosted IT environment.
Figure 1B:
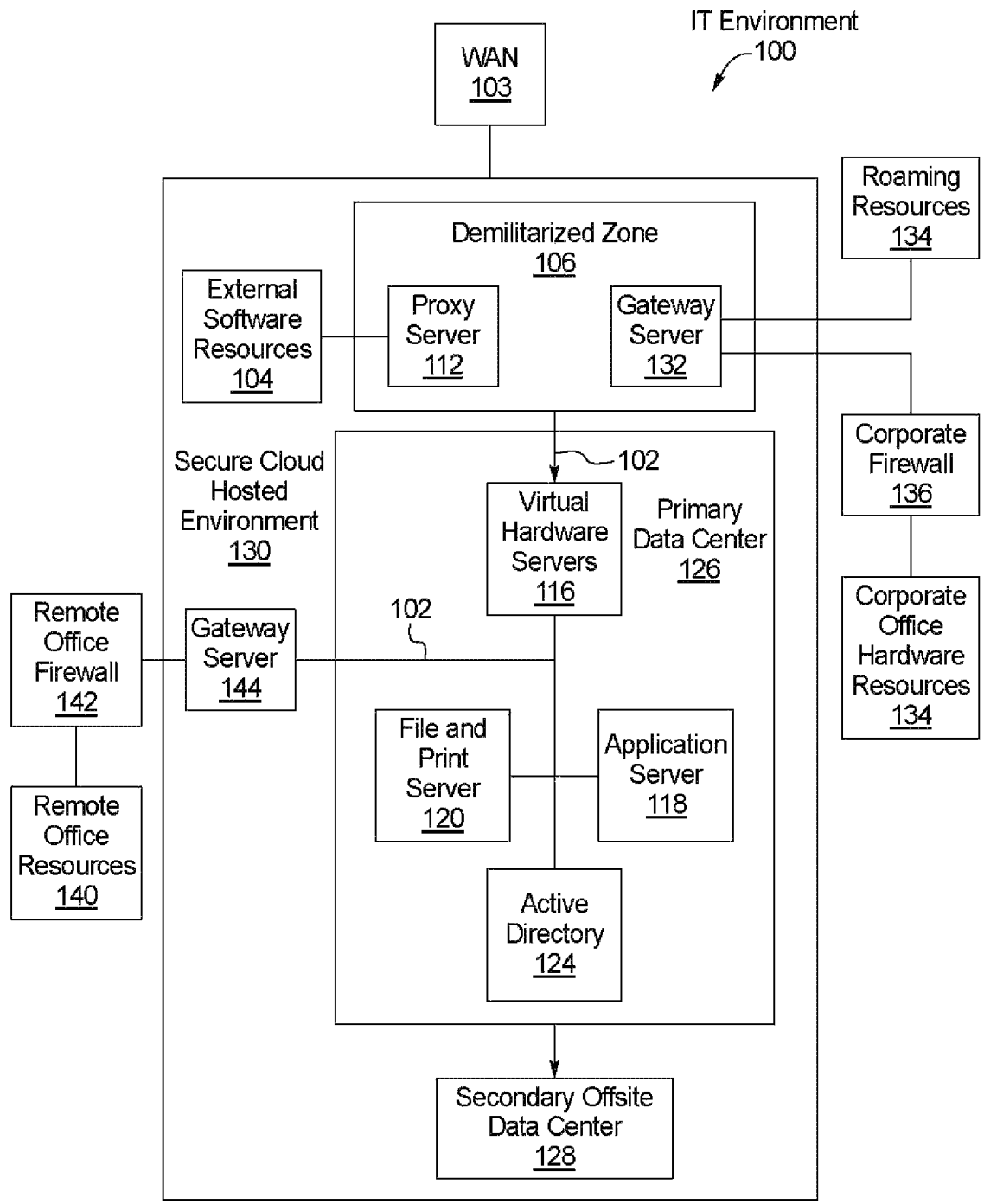
FIG. 1B is an example of a public cloud hosted IT environment.

FIG. 1A is a schematic diagram of an example of an IT environment 100 hosted in a private cloud. FIG. 1B is a schematic diagram of an example of an IT environment 100 hosted in a public cloud. The examples shown in FIGS. 1A and 1B are merely representative examples of privately and publicly hosted IT environments 100, numerous variations of each of which will be understood by those skilled in the art based on the teachings provided herein.

As shown in FIG. 1A, the privately/locally hosted IT environment 100 includes an internal LAN 102 separated from external software resources 104 by a demilitarized zone 106 (i.e., perimeter network). The DMZ 106 includes external-facing servers, resources, and services that are accessible by the external software resources 104 through a perimeter firewall 108. The perimeter firewall 108 is configured to only allow traffic to the DMZ 106. An internal firewall 110 is configured to only allow traffic from the DMZ 106 to the internal LAN 102.

As shown in FIG. 1A, the DMZ 106 includes an ADFS proxy server 112 that brokers a connection between one or more external resources 104 (e.g., Microsoft Office 365, Exchange, Skype for Business, OneDrive, SharePoint Online, etc.) and the internal firewall 110. As further shown in FIG. 1A, the DMZ 106 includes a security gateway 113 (e.g., VMware View Secure Gateway Server) through which users' hardware resources access the internal LAN 102, as described further herein.

Inside the internal firewall 110, the internal LAN 102 connects each of its constituent parts. As shown, just inside the internal firewall 110 a virtual desktop manager 114 communicates with one or more virtual hardware servers 116. Each of the virtual hardware servers 116 communicate with an application server 118 hosting third-party applications, a file and print server 120 hosting file shares and print services, a remote desktop session host 122 hosting third-party custom applications, and an active directory domain controller 124 including the Domain Name System and the Dynamic Host Configuration Protocol. Each of these components forms the primary data center 126. The primary data center 126 is continuously replicated in a secondary offsite data center 128.

Turning to FIG. 1B, the publicly/remotely hosted IT environment 100 includes a secure cloud hosted environment 130 within which resides an internal LAN 102 separated from software resources 104 by a demilitarized zone 106. In the example shown in FIG. 1B, the DMZ 106 includes an Active Directory Federation Services (AD FS) proxy server 112 and a remote desktop gateway server 132 through which remote access to the internal LAN 102 is provided. The elements of the internal LAN 102 are replicated within the secure cloud hosted environment 130.

For example, in the embodiment shown in FIG. 1B, corporate office hardware resources 134 (e.g., laptops, desktops, smartphones, thin clients, monitors, printers, scanners, servers, etc.) sitting behind a corporate firewall 136 access the internal LAN 102 through a remote desktop gateway server 132 in the DMZ 106 of the secure cloud hosted environment 130. Similarly, roaming resources 138 (e.g., laptops, desktops, smartphones, etc.) that are not located behind a firewall may access the internal LAN 102 through the same remote desktop gateway server 132. In another example, additional remote office resources 140 that are located behind a remote office firewall 142 are configured to access the internal LAN 102 through another remote desktop gateway server 144 located within the secure cloud hosted environment 130.

In each of the examples shown in FIGS. 1A and 1B, the one or more virtual hardware servers 116 may be setup to support one or more classes of shared resources and one or more classes of dedicated resources. In one example, the virtual hardware servers 116 support a first set of shared virtual desktop instances for light users and a second set of shared virtual desktop instances for regular users. Additionally, the virtual hardware servers 116 support a first set of persistent (i.e., personally assigned) virtual desktop instances for power users and a second set of persistent virtual desktop instances for super users. As will be recognized by those skilled in the art based on the teachings provided herein, any number of classes of shared and persistent virtual desktop instances may be supported.

The features and functions of the unified IT automation platform described herein relate to the setup, operation, and maintenance of the IT environment 100 described above with respect to FIGS. 1A and 1B. It will be appreciated by those skilled in the art based on the teachings provided herein that the unified IT automation platform may be adapted to cooperate with a wide range of variations in the IT environment 100.

Figure 2:
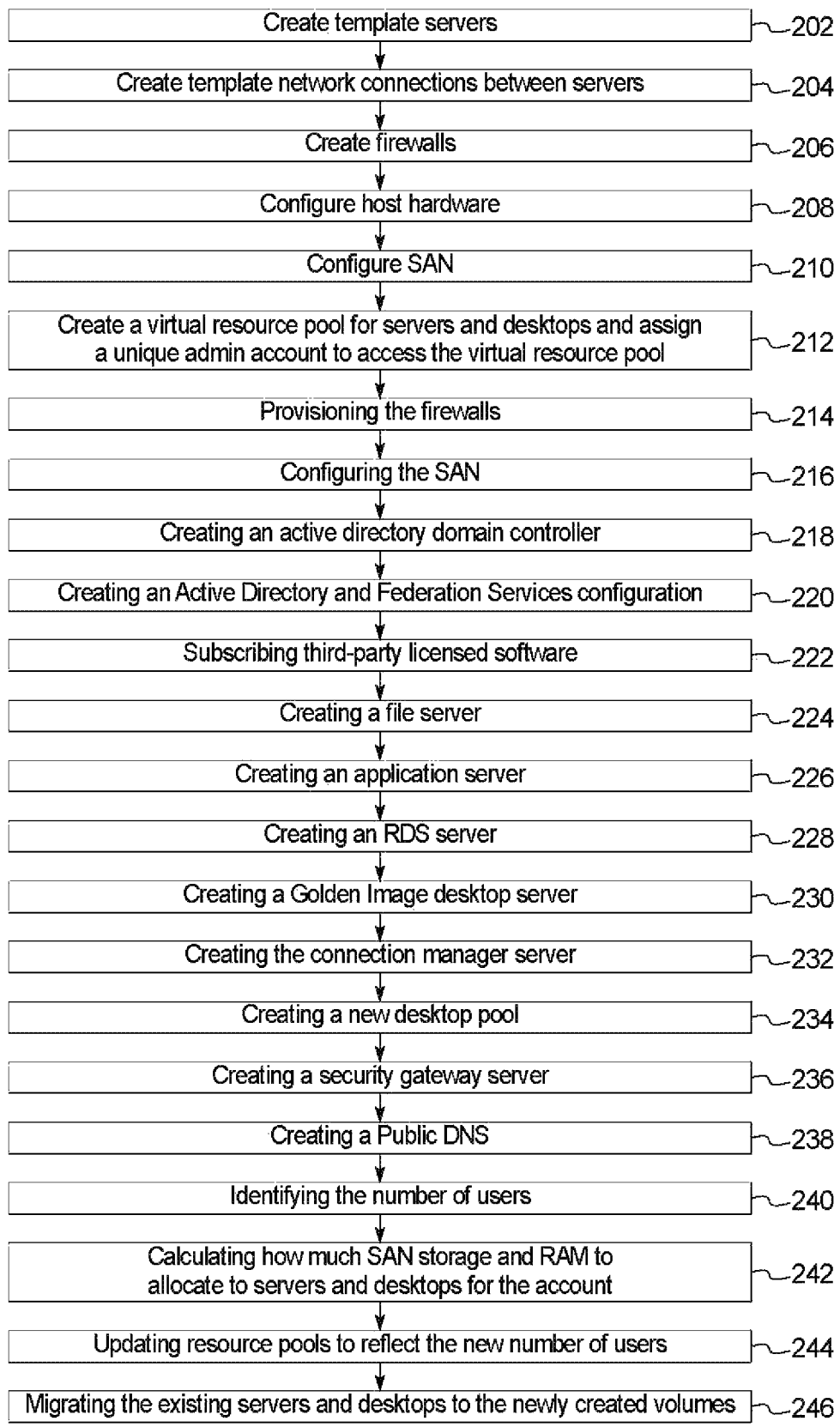
FIG. 2 is a flow chart illustrating steps in an example method of automatically provisioning an IT environment, without human intervention.

FIG. 2 is a flow chart diagramming the steps of a provisioning method 200 for provisioning the IT environment 100 shown in FIG. 1.

The unified IT automation platform, and the provisioning method 200 embodied therein, allow for pre-provisioning and provisioning of the IT environment 100. In the pre-provisioning process, one or more "template" environments are built to make automatic provisioning of the IT environment 100 possible. The template environments are then cloned and "serialized" (i.e., made unique for a specific customer) during the provisioning process. The sequence and timing of the steps in the provisioning process are essential as there are a multitude of prerequisites and dependencies in the process.

There are twenty-three steps in the provisioning method 200 shown in FIG. 2. However, it is understood that the delineation between steps is in part a function of the author's rhetorical choices and that the provisioning method 200 may be described as including a greater or lesser number of steps while accomplishing the objects and advantages of the subject matter presented herein, as will be recognized by those skilled in the art based on the teachings herein. The following is a listing of the steps shown in FIG. 2. Additional details for each step follow.

First step 202: create template servers.

Second step 204: create template network connections between servers.

Third step 206: create firewalls.

Fourth step 208: configure host hardware.

Fifth step 210: configure SAN.

Sixth step 212: create a virtual resource pool for servers and desktops and assign a unique admin account to access the virtual resource pool.

Seventh step: 214: provisioning the firewalls.

Eighth step 216: configuring the SAN.

Ninth step 218: creating an active directory domain controller.

Tenth step 220: creating an Active Directory and Federation Services configuration.

Eleventh step 222: subscribing third-party licensed software.

Twelfth step 224: creating a file server.

Thirteenth step 226: creating an application server.

Fourteenth step 228: creating an RDS server.

Fifteenth step 230: creating a Golden Image desktop server.

Sixteenth step 232: creating the connection manager server.

Seventeenth step 234: creating a new desktop pool.

Eighteenth step 236: creating a security gateway server.

Nineteenth step 238: creating a Public DNS.

Twentieth step 240: identifying the number of users.

Twenty first step 242: calculating how much SAN storage and RAM to allocate to servers and desktops for the account.

Twenty second step 244: updating resource pools to reflect the new number of users.

Twenty third step 246: migrating the existing servers and desktops to the newly created volumes.

As noted above, the provisioning method 200 shown in FIG. 2 encompasses both the "pre-provisioning" process of creating a template environment, as well as the cloning and serializing of the template environment in the "provisioning" process.

The first step 202 in the provisioning method 200 shown in FIG. 2 is the creation of the template environment. This first step 202 includes the creation of templates of the servers to be used in the IT environment 100. In one specific example, through the first step 202 in the provisioning method 200, an initial template environment is created to include each of the following servers, wherein each of the servers are activated using a key management service (KSM) via a centrally hosted KSM host. In this example, the servers include, but are not limited to, a DC01 Active Directory Domain Controller 124, an FS01 File and Print server 120, a PRX01 Active Directory Federation Services proxy server 112, a CM01 VMware Horizon View Connection Manager server 114, a SG01 VmWare Horizon View Security Gateway server 113, an RDS01 RemoteApp Publishing server 122, an APPS01 Application server 118, and a WS00 Golden Image Desktop server 116.

Further description of the servers created in the first step 202 follow. These descriptions are intended to be illustrative of one or more very specific implementations of the template IT environment 100. Those skilled in the art will recognize the range of template IT environments 100 possible based on the descriptions provided herein.

The DC01 Active Directory Domain Controller 124 is the core of the template IT environment 100. In a preferred embodiment, the IT environment 100 uses a non-public DNS name for the domain (e.g., nerdio.int) to avoid any chances of conflicts with potential customers' networks. All LAN housed servers are joined to the domain as members. The DC01 Active Directory Domain Controller 124 acts as a DHCP server to provide dynamic IP addresses to desktops and any newly created servers. Additionally, the DC01 Active Directory Domain Controller 124 acts as a DNS server for the entire network. Further, in some instances, the DC01 Active Directory Domain Controller 124 acts as ADFS server 112, which connects one or more external resources 104 to the AD environment in the template IT environment 100 (e.g., connects an Azure AD, and subsequently Microsoft Office 365, to the AD environment in the template IT environment 100).

The AD environment in the template IT environment 100 is authoritative for users. For example, Azure AD authentication requests would be forwarded to ADFS on the DC01 Active Directory Domain Controller 124 for validation. The DC01 Active Directory Domain Controller 124 acts as a primary server for SMS PASSCODE a tool that controls multi-factor authentications for users connecting to their desktops. It may be configured to require a second factor (e.g., SMS) when users have a mobile phone number specified in the AD and are members of a two-factor authentication security group. In some embodiments, AD Security groups are pre-configured to allow for maximum flexibility and security. For example, a separate organizational unit (OU) may be created called "Users and Groups", which is separate from the rest of the AD. In such instances, customer administrators could be given delegated admin access to this OU, but not to the rest of the environment, to prevent them from disrupting the fine tuning. Another OU may be created called "System Objects" that houses backend security groups and users that are not to be edited by customer administrators. Group Policy Objects may be created to optimize the environment, and folder redirection GPO for desktop and documents folders. Office 2016 GPO with optimizations such as disable hardware acceleration, enable automatic Office activation, limiting Outlook cache to 12 months, etc.

Additionally, the template IT environment 100 includes an FS01 File and Print server 120. In one embodiment, this server acts as a file server with preconfigured set of file shares. The FS01 File and Print server 120 is beneficial because it is accessible to internal users that have been granted read/write permissions. Additionally, the FS01 File and Print server 120 can be mapped as a P: drive for users upon login.

The FS01 File and Print server 120 may also act as a department drive with sub-folders unique and accessible to each department (e.g., sales, marketing, finance, etc.). In such an embodiment, the FS01 File and Print server 120 is mapped as T: drive for users upon login.

The FS01 File and Print server 120 can additionally allow individual users to create their drive with subfolders unique and accessible only to each user. In such an embodiment, the FS01 File and Print server 120 is mapped as U: during login. The user folder contains the user's Desktop and Documents folder. Regardless of the virtual desktop the user uses, the desktop/documents folders are redirected to this location. In one example of the IT environment 100, there are two windows volumes (and virtual disks): C: for system files and D: for all of the data. In a preferred embodiment, all of the above-mentioned shares reside on D:.

Logically, the FS01 File and Print server 120 also acts as a print server. Network-based printers are installed as objects with TCP/IP ports pointing at printers at the other end of a VPN tunnel before the printer object is shared to the users.

The template IT environment 100 further includes a PRX01 Active Directory Federation Services proxy server 112, which hosts web application proxy roles. For example, the PRX01 Active Directory Federation Services server 112 may have an external host name of adfsXXXX.nerdio.net (where XXXX is a unique account ID). Authentication requests from outside of the network (e.g., the Internet) come to this URL and are then forwarded to the DC01 Active Directory Domain Controller 124 for validation. Moreover, in another embodiment, a wildcard SSL certificate may be installed on the PRX01 Active Directory Federation Services server 112 and the DC01 Active Directory Domain Controller 124 for ADFS encryption. For example, a wildcard certificate for *.nerdio.net would allow any nerdio.net account ID to be used and still have a valid SSL connection.

The template IT environment 100 also includes a CM01 VMware Horizon View Connection Manager server 114. In an embodiment, the Horizon View Administrator and connection manager are installed on this server. Most of the configuration prior to serializing the instance is done in the template. For example, within this CM01 VMware Horizon View Connection Manager server 114 template licensing is added and global policies are pre-configured. Conversely, vCenter servers are not added at this stage (but later) and desktop pool are not created at this stage. Thus, in the pre-provisioning configuration (i.e., prior to serializing), the CM01 VMware Horizon View Connection Manager server 114 acts as an intermediary.

Additionally, VMware PowerCLI with View add-in may be installed on the CM01 VMware Horizon View Connection Manager server 114 to allow programmatic control of the IT environment 100. For security, a wildcard SSL certificate for *.nerdio.net may be preinstalled on this server to prevent SSL warning prompts.

The template IT environment 100 also includes a SG01 VmWare Horizon View Security Gateway server 113. In this embodiment of the IT environment 100, the SG01 VmWare Horizon View Security Gateway server 113 is installed and securely paired with the CM01 VMware Horizon View Connection Manager server 114. Additionally, a wildcard SSL certificate for *.nerdio.net is preinstalled on this server to prevent SSL warning prompts.

In this example, the template IT environment 100 also includes the RDS01 RemoteApp Publishing server 122, which allows administrators to publish difficult to maintain applications to groups of users as a remote application instead of installing the application on each individual virtual desktop. In an embodiment, the RD Connection Broker, RD Web Access, and RD Session hosts roles are installed on this server. Additionally, a default remote application collection is created to allow easily to add new remote applications and select which users to publish them to. Further, a wildcard SSL certificate for *.nerdio.net is pre-installed on this server to prevent SSL warning prompts. In a possible embodiment, a Public DNS zone called rdweb.nerdio.net exists and points at the internal IP of the RDS01 RemoteApp Publishing server 122 (not accessible externally, but accessible internally). Additionally, local security policy on the RDS01 RemoteApp Publishing server 122 is configured to point at a RD Licensing server role installed on the RDS01 RemoteApp Publishing server 122.

Within the RDS01 RemoteApp Publishing server 122, the group policy objects (GPO) on the DC01 Active Directory Domain Controller 124 automatically configure the location for Remote Desktops and Applications on desktops to automatically connect to rdweb.nerdio.net without prompts and further cause the desktops to pull all published applications for which they have access. This allows any remote application that is published on the RDS01 RemoteApp Publishing server 122 to be automatically available in the start menu of authorized users on virtual desktops without any additional configuration or shortcut/RDP file creation.

The template IT environment 100 also includes the APPS01 Application server 118, which is a blank application server joined to the domain to allow for installation of line of business applications or databases.

Lastly in this example, the template IT environment 100 also includes the WS00 Golden Image Desktop server 116, which is used as the image for creating additional desktops. In a preferred embodiment, the WS00 Golden Image Desktop server 116 comprises a Windows Server 2012 R2 or Server 2016 based VM which is highly optimized for a VDI environment using the VMware optimization tool. Additionally, Office ProPlus is pre-installed, but not activated. This allows for the Start menu, desktop, quick launch bar, background, login screen, and other user noticeable areas to be highly customized for a good user experience. The desktop experience role is installed and registry entries are added to optimize the user experience making the server OS virtually indistinguishable from a desktop OS. Unneeded services are turned off in the template.

As noted, the preceding description of the features and functions of the servers in the template IT environment 100 is merely a description of one set of examples of the execution of the first step 202 (i.e., creating the template servers) in the provisioning method 200. The examples serve to demonstrate to those skilled in the art the manner in which this first step 202 may be implemented, a broader scope of which will be appreciated by those skilled in this art based on the examples provided.

In addition to the creation of the servers provided above, from a networking perspective, the servers need to maintain a specific set of allowed connections between each other and the public internet. The network connections comprise three zones: WAN 103, DMZ 106, and LAN 102, the configuration of which is created in a second step 204 of the provisioning method 200 shown in FIG. 2.

The first infrastructure component, the WAN 103, constitutes the public Internet outside of the IT environment 100.

The second infrastructure component, the DMZ 106, includes a limited access internal zone that houses the PRX01 Active Directory Federation Services proxy server 112 and the SG01 VmWare Horizon View Security Gateway server 113. WAN devices are allowed to connect to the PRX01 Active Directory Federation Services proxy server 112 on port 443 to carry ADFS network to be passed to the ADFS server (i.e., the DC01 Active Directory Domain Controller 124). WAN devices are also allowed to communicate with the SG01 VmWare Horizon View Security Gateway server 113 on all the necessary VMware Horizon (View) network ports to allow for desktop connectivity (e.g., PCoIP, USB redirection, HTTPS authentication, etc.).

The third infrastructure component is the LAN 102. All other servers and desktops not named above reside in this "zone," No connectivity is allowed from the WAN 103 directly to the LAN 102. However, the PRX01 Active Directory Federation Services proxy server 112 can communicate with DC01 Active Directory Domain Controller 124 for ADFS traffic on port TCP/443 and the SG01 VmWare Horizon View Security Gateway server 113 can communicate with the CM01 VMware Horizon View Connection Manager server 114 on the VMware Horizon published set of ports to route desktop and authentication traffic.

The IP scheme is strictly defined as part of the template and each network and server device is assigned a static IP address. This makes it possible to properly manage the network with an admin portal (AP), which expects the build of the environment to follow pre-defined standards and can find the servers where expected.

The chosen network needs to be large enough to accommodate sizable organizations and must use an IP numbering scheme reserved for private networks. In one example, 10.125.0.0/16 is selected for its ability to accommodate 65K devices while being obscure enough that the chances of overlapping with a customer's existing on-premise network are low. If there is an overlap, the customer's network must then be renumbered to use a different IP scheme. The /16 network is split up between LAN 102 and DMZ 106 as follows: LAN: 10.125.0.0/17, DMZ: 10.125.254.0/24.

The third step 206 in the provisioning method 200 is creating firewalls. The network infrastructure in the IT environment 100 includes one or more firewalls. In a preferred embodiment of the systems and methods described herein, each customer's individual environment has a common IP scheme, which means that the underlying routing and firewall solution must support overlapping IP ranges for multiple customers. In one embodiment, a firewall from Fortinet is used. The firewall provides for individual virtual firewalls that run on the same hardware but are isolated from one customer to another (known as virtual domains, i.e., "VDOM"). Each customer gets a VDOM, which can then be customized in terms of its settings. However, external and internet IPs are not changeable by the customer without provider's intervention.

In the fourth step 208 (i.e., configure host hardware) the hardware within which the IT environment 100 is hosted is configured. In a suggested embodiment, the hardware platform on which the IT environment 100 is resident is tuned to support multi-tenancy, but with maximum amount of isolation between tenants (i.e., customer-users). Within the network, the computer hardware may be irrelevant as long as it is configured properly with on an ESXi host such as, for example, VMware vSphere hypervisor. For example, the configuration may include clustering multiple disk-less compute hosts into clusters under two vCenters for licensing reasons.

The IT environment 100 also allows for the use of a centralized management application that lets you manage virtual machines and ESXi hosts centrally, such as, for example, VMware vCenter server. The IT environment 100 may contain a cluster of many compute hosts with HA/DRS/vMotion and all vSphere Enterprise Plus features enabled to allow for maximum redundancy. It may be necessary to keep all server workloads separated from desktop works loads for licensing reasons. In the primary example used herein, the following servers run in this vCenter: DC01 Active Directory Domain Controller 124, FS01 File and Print server 120, APPS01 Application server 118, RDS01 RemoteApp Publishing server 122, PRX01 Active Directory Federation Services proxy server 112, and any newly created servers. Additionally, the IT environment 100 may include a Desktop vCenter, which contains a cluster of many compute hosts with HA/DRS/vMotion enabled for desktop workloads. In the primary example used herein, the servers/desktops that run here are: CM01 VMware Horizon View Connection Manager server 114, SG01 VmWare Horizon View Security Gateway server 113, and the WS00 Golden Image Desktop server 116.

Furthermore, as described above with respect to step the first step 202, each account has an associated "Customer Administrator" account in vSphere which entitles this account to view only the objects that are part of this account's environment and nothing else. All objects are identified by the XXXX customer ID. These objects include: Resource Pool, datastore, VM folder, dvS portgroup, layer 2 physical switch VLAN, etc. Any components of an individual customer's environment that connect to vCenter (e.g., CM01 VMware Horizon View Connection Manager server 114 to create a new desktop VM) always use the unique customer administrator account. Because each administrator's account only has access to the authorized IT environment 100, each customer is completely limited from seeing resources of any other customers. Since individual customer IT environments 100 do not have management network level access to the vCenter, the connectivity happens through a public IP and host name assigned to each vCenter (vc01.nerdio.net and vc02.nerdio.net) and FortiGate firewall controls access to the vCenter by only allowing it to come in from pre-defined IP subnets inside of the platform's data center. The CM01 VMware Horizon View Connection Manager server 114, for instance, connects to vc02.nerdio.net and authenticates with the customer's unique administrator account in vSphere to perform its actions.

The fifth step of the provisioning method 200 is configure the storage access network (SAN). In a contemplated preferred embodiment of the IT environment 100, storage requires the use of a fast SAN for hosting of servers and desktops and needs to support programmatic access to create/delete/manage volumes and mount them on ESXi hosts. The storage systems need to support a structure in which each customer gets their own datastore in Vmware. This means a dedicated volume presented with either iSCSI or NFS. Additionally, servers need to be on at least SSD accelerated hybrid storage and desktops on all-flash storage. In an embodiment, XCOPY VAAI primitive compatibility provides a great benefit to speed up desktop deployment. Additionally, the backup is automatically enabled on all systems, and shadow copy backups are enabled on all template windows volumes. Further, SAN snapshot backups are created on all volumes that are part of the collection, and SAN replication is configured for volumes in certain volume collections depending on selected service package.

At this point in the provisioning method 200, the pre-provisioning portion of the method is complete. The template of the IT environment 100 now includes: a full configuration of template servers to enable each of the required system functions; a map of network connections between the servers; firewalls protecting the network connections; host hardware configured to delineate each environment from the others; and a storage area network configured for speed and reliability. In a preferred embodiment, in which the provisioning method 200 is used to setup multiple customer-users with distinct IT environments 100, the pre-provisioning steps of the provisioning method 200 are completed prior to the registration of a customer-user.

In the example used herein, the provisioning method 200 provides steps for pre-provisioning, trial provisioning, and paid account provisioning. It will be recognized by those skilled in the art that the provisioning method 200 may simply be pre-provisioning and provisioning, with no distinction between trial provisioning and paid account provisioning.

In the following example, there are three plans available for each customer-user: (1) Professional; (2) Performance; and (3) Enterprise and there are two stages of provisioning: (1) trial provisioning; and (2) upgrade to paid account. In this example, after the pre-provisioning steps are complete, a customer-user signs up for a 14-day trial, which triggers the trial provisioning. In this example, the trial account is the equivalent of a "Professional" plan and is limited to five users. Any time during the trial the customer-user can upgrade the account to a paid account and select the plan that is most appropriate for the customer-user. The plan details of this specific example are illustrative only. Those skilled in the art will recognize a wide variety of alternatives based on the teachings provided herein.

As shown in FIG. 2, the sixth step 212 in the provisioning method 200 (and the first step in the provisioning of a trial or paid account using the template IT environment 100) is the creation of the customer-user's network and virtual infrastructure from the template IT environment 100, including the creation of the virtual resource pool for servers and desktops and an assignment of a unique admin account to access the virtual resource pool. As part of the creation of the virtual resource pool, the provisioning method 200 creates a folder structure and a unique virtual network port group.

The seventh step 214 is firewall provisioning, in which, in this example, a virtual instance of a dedicated FortiGate firewall is created for the new customer-user.

The eighth step 216 is configuring the storage area network (SAN). In this example, an iSCSI or NFS volume for server VMs and another volume for desktop VMs are created and mounted to all ESXi hosts and sized based on the number of users (e.g., five trial users). The eight step 216 also includes adding the new volume to volume collection on the SAN to enable daily backups.

The ninth step 218 is creating an active directory domain controller. In this step, the pre-configured DC01 Active Directory Domain Controller 124 template is cloned, placed on the customer's private vnetwork, and powered on.

The tenth step 220 is creating an Active Directory and Federation Services configuration. In this step, an administrator password is set to a randomly generated value and a user principle name (UPN) suffix is added to AD of XXXX.nerdio.net (where XXXX is the unique customer ID). In this example, this will be a unique "trial" domain and will be fully functional for the new customer-user. Additionally, in this step and for this example, the username of all existing demo accounts (there are 4 preconfigured ones) are changed to new UPNs, passwords are set for all demo user accounts, and/or ProxyAddresses AD attributes are added to all accounts to allow for consistency in synchronization with the Azure AD.

The eleventh step 222 is subscribing third-party licensed software. For a representative example of this step, the example eleventh step 22 includes subscribing the users to Microsoft Office 365 ("O365"). If the customer-user is a direct customer of Microsoft (i.e., not through reseller), the system uses a custom Office 365 subscription provisioning tool (specially created for this purpose) to create five new Business Premium licenses for the trial account. If the customer-user is a customer of a Microsoft reseller, the system does not create a new subscription, but instead uses the existing O365 tenant. Additionally, the invention can connect to O365 via PowerShell and enable AAD synchronization and add custom domains to O365: XXXX.nerdio.net. This returns a verification TXT DNS record to be added to Nerdio.net. Moreover, the system uses a programmatically controllable DNS service that hosts Nerdio.net DNS zone (in one example, a Google Cloud DNS) and creates a new TXT record for XXXX.nerdio.net with the O365 provided verification text. Finally, the system requests O365 to verify domain ownership by checking the newly added DNS record.

In this representative example, the example eleventh step 222 also includes Azure AD integration. Azure AD Synch is a primarily GUI based tool used for synchronization of AD with Azure AD (AAD). These tools are pre-installed on the template IT environment 100 and point at a staging O365 tenant since it is not possible to install Azure AD without pointing at an existing tenant. However, the scheduler is set to "off" on the template, which prevents AAD Sync from trying to synch automatically. All of the actions described below are performed directly on the DC01 Active Directory Domain Controller 124 using VMware's Invoke-VMScript command since, for security reasons, there is no direct network connection between the provisioning server and any of the customers' networks. The system renames "tenant.onmicrosoft.com-AAD" connector in AD Sync tool via PowerShell to "NEWtenant.onmicrosoft.com-AAD." The system then changes the username and password on the newly renamed connector to the admin username and password provided during new customer addition, or to the default one, if the customer is direct and not through a reseller. Additionally, the system triggers an initial synchronization, connects to O365 from the DC01 Active Directory Domain Controller 124, and converts the XXXX.nerdio.net domain to Federated from the default Managed one, sets a location, assigns O365 licenses to demo users, and deletes the XXXX.nerdio.net TXT verification record now that the domain is verified. In an embodiment, the invention configures the FS01 File and Print server 120 as a SMTP relay server to allow for scanners and applications on the inside of the Nerdio network to relay email without authentication. It further points the FS01 File and Print server 120 at O365 as the smarthost. Additionally, the system reads all verified domains in O365 and adds them as additional UPNs in AD. This is critical when the customer already has O365 set up.

The twelfth step 224 is creating a file server. In this step, the system clones the FS01 File and Print server 120 from the template, places it on the correct network, and powers it on.

The thirteenth step 224 is creating an application server. To do so, the system clones the APPS01 Application server 118 from the template, places it on the correct network, and powers it on.

The fourteenth step 228 is creating an RDS server. In this step, the system clones the RDS01 RemoteApp Publishing server 122 from the template, places it on the correct network, and powers it on.

The fifteenth step 230 is creating a Golden Image desktop server. In this step, the system clones the WS00 Golden Image Desktop server 116 from the template, places it on the correct network, and powers it on. Additionally, the system determines the version of key software that will be used in the environment and installs the correct version using pre-configured installation scripts stored in a hidden share on the FS01 File and Print server 120. Further, the invention converts the WS00 Golden Image Desktop server 116 to a VMware Template to be used for deployments.

The sixteenth step 232 is creating the connection manager server. In this step, the system clones the CM01 VMware Horizon View Connection Manager server 114 from the template, places it on the correct network, and powers it on. An available public IP is passed to this script from a database of IPs maintained by the provisioning server. Additionally, the system adds vCenter to VMware connection manager using the VMware.View.Broker plugin to PowerShell. The vCenter uses the customer's unique vCenter admin credentials and configures Connection Server settings using PowerShell via the Invoke-Script command via the IP address and URL. Additionally, in step 232, the system sets Blast protocol URL using ADAM database and adds XXXX.nerdio.net and any other custom domains found in UPNSuffixes in AD to SMS Passcode's RADIUM client to allow connections from users at these domains.

The seventeenth step 234 is creating a new desktop pool. The system in this example uses the Vmware.View.Broker PS plugin. In an embodiment, the pool type is an automatic full clone with dedicated user assignment, based on the WS00 Golden Image Desktop server 116. In the example template, the template includes Datastore: VDI-VOLXXXX, Folder: XXXX\LAN\Desktops, Resource Pool: ResPoolXXXX, Default Protocol: PCOIP, Pool Name: DesktopPool1, and Pool max size: 5 (headroom: 3). Additionally, the system allows for adding of entitlement to VDI users group to the newly created desktop pool.

The eighteenth step 236 is creating a security gateway server. To do so, the invention clones the SG01 VmWare Horizon View Security Gateway server 113 from the template, places it on the DMZ 106, and powers it on. Additionally, the system configures security server settings similar to connection server settings on the CM01 VMware Horizon View Connection Manager server 114, sets a blast protocol URL using ADAM database, configures HTML Access properties on DesktopPool1 using ADAM database, enables CBRC host-based caching using ADAM database, and sets CBRC blackout periods for all hours of M-F.

The nineteenth step 238 is creating a Public DNS. The invention configures DNS zone for XXXX.nerdio.net (hosted at Google DNS) with all of the necessary O365 DNS records and adfsXXXX.nerdio.net/idsXXXX.nerdio.net.

With the conclusion of the nineteenth step 238, the trial provisioning portion of the provisioning method 200 is complete. At this stage of the process, the customer-user has a fully-functioning, automatically-provisioned, IT environment 100 for use with five trial accounts. Of course, the previous steps can be modified such that a greater or lesser number of trial users may be created and can be modified such that the provisioning method 200 skips the creation of a trial setup and goes straight to the final version of the IT environment 100.

Assuming the steps above we implemented in setting up an intermediary trial version of the IT platform 100, the next part of the process is upgrading the IT environment 100 from the trial state to a final state. The following steps are organized to complete that process.

The twentieth step 240 in the provisioning method 200 is identifying the number of users.

Based on the number of users identified in the twentieth step 240, the twenty first step 242 is calculating how much SAN storage and RAM to allocate to servers and desktops for the account.

The twenty second step 244 is updating resource pools to reflect the new number of users (e.g., increases number of users from 5 to 100). With the increased users, the invention creates new SAN volumes with larger sizes, enables encryption, hourly backup, and replication schedules, and mounts these volumes to all hosts.

The twenty third step 246 is migrating the existing servers and desktops to the newly created volumes. In one example, the system uses VMware Storage vMotion to perform a live migration of all the existing trial servers and desktops to the newly created volumes. In a specific example, all users are moved to an Enterprise Users group, which entitles the users to higher internet browsing speed via the firewall. As part of the twenty third step 246, the following processes are carried out, in this specific order: first the system installs the RMM (e.g., Kaseya) agent on all of the servers and the golden image desktop; then the system removes any demo accounts (if requested); next the system converts the WS00 Golden Image Desktop server 116 from a template to a VM; then the system upgrades the WS00 Golden Image Desktop server 116 RAM, the number of CPUs, and the hard drive size before powering on the WS00 Golden Image Desktop server 116; then the system uses diskpart script grow C: drive to take advantage of the added HD space; next the system reinstalls third-party software, if needed; then the system shuts down the previous WS00 Golden Image Desktop server 116 and sets it back to template; next the system upgrades the desktop pool on the CM01 VMware Horizon View Connection Manager server 114 to the appropriate settings for monitors capability and the requisite number of desktops (e.g., increases the number of desktops from 5 to 100 to match the number of users), and finally sets the headroom to 25% of max.

At this stage, the provisioning method 200 is complete and the IT environment 100 is ready for the customer-user.

The description of the provisioning method 200 above is based on the private cloud version of the IT environment shown in FIG. 1A. The provisioning method 200 may also be used to provision the IT environment 100 in a public cloud, such as with Microsoft Azure and RDS. Like the private cloud embodiment described above, the public cloud embodiment begins with a pre-provisioning process. To make automatic provisioning of the IT environment 100 possible, much of the initial work needs to be done on building a "template" environment, which is then cloned during the provisioning process and "serialized" (made unique for a specific customer) during the run-time provisioning process.

Similar to the above described embodiment, the initial template environment consists of the following servers:

DC01 Active Directory Domain Controller 124. The core of the template environment is the Active Directory domain. A possible embodiment includes a DNS name for the domain (nerdio.int) to avoid any chances of conflicts with potential customers' networks. All LAN 102 housed servers are joined to the domain as members. Additionally, the DC01 Active Directory Domain Controller 124 acts as a DNS server for the entire network. Moreover, the DC01 Active Directory Domain Controller 124 acts as an ADFS server, which connects Azure AD and subsequently Office 365 to the AD environment. The AD environment is authoritative for any users in the IT environment 100, meaning that Azure AD authentication requests gets forwarded to ADFS on the DC01 Active Directory Domain Controller 124 and get validated there. The DC01 Active Directory Domain Controller 124 acts as a primary server for SMS PASSCODE a tool that controls multi-factor authentications for users connecting to their desktops. It is configured to require a second factor (e.g., SMS) when users who have a mobile phone number specified in AD and are members of the two-factor authentication security group. AD Security groups are pre-configured to allow for maximum flexibility and security. A separate OU is created called "Users and Groups", which is separate from the rest of AD. Customer administrators are given delegated admin access to this OU but not to the rest of the environment to prevent them from disrupting the fine tuning.

Another OU is created called "System Objects". This OU houses backend security groups and users that are not to be edited by customer administrators. Additionally, in this embodiment of the First Aspect, Group Policy Objects are created to optimize the environment. This includes folder redirection GPO for desktop and documents folders and Office 2016 GPO with optimizations such as disable hardware acceleration, enables automatic third-party software activation, limits third-party software cache to 12 months, etc.

FS01 File and Print server 120. This server acts as a file server with preconfigured set of file shares, as follows. The server is public-accessible to everyone with read/write permissions. The FS01 File and Print server 120 is mapped as P: drive for users upon login. Additionally, it includes department drives with sub folders unique and accessible to each department (e.g., sales, marketing, finance, etc.). The FS01 File and Print server 120 can also be mapped as T: drive for users upon login. Finally, users-individual user drive with subfolders unique and accessible to each user only. In such a mode, the server is mapped as U: during login. The user folder contains every users' Desktop and Documents folder. Regardless of the virtual desktop the user uses, the desktop/documents folders are redirected to this location.

There are two windows volumes (and virtual disks); C: for system files and D: for all of the data. All of the above mentioned shares reside on D:. Additionally, FS01 File and Print server 120 also acts as a print server. Network based printers are installed as objects with TCP/IP ports pointing at printers at other end of VPN tunnel and then the printer object is shared to the users. 101401 PRX01 Active Directory Federation Services proxy server 112. This server hosts web application proxy role and has an external host name of adfsXXXX.nerdio.net (where XXXX is unique Nerdio account ID). Authentication requests from outside of the network (e.g., the Internet) come to this URL and are then forwarded to the DC01 Active Directory Domain Controller 124 ADFS role for validation. Additionally, the PRX01 Active Directory Federation Services proxy server 112 allows for a wildcard SSL certificate to be installed on the PRX01 Active Directory Federation Services proxy server 112 and the DC01 Active Directory Domain Controller 124 for ADFS encryption. This wildcard certificate is for *.nerdio.net, which allows any account ID to be used and still have a valid SSL connection.

RDGW01 Remote Desktop Gateway server 132. This server resides in the DMZ 106 with needed connectivity to the domain controller and RD session hosts. Additionally, it hosts the RD gateway role that encrypts all RDP (e.g., desktop streaming) traffic from the public Internet, and hosts its own DNS server with mapping between public names of RD session hosts (which are not publicly accessible directly) and their internal resolvable DNS names. This is required to eliminate all SSL warnings since all public names fall under the *.nerdio.net wildcard cert. Additionally, the RDGW Remote Desktop Gateway server 132 allows for wildcard *.nerdio.net cert to be installed on the server. In one mode, HTTPS tunneling is enabled to allow for UDP encryption of RDP traffic to increase performance, and RDS Users Group, VDI Users Group, and IT Department group are the only AD groups that are allowed to tunnel through this server to the LAN 102.

RDSH01 Remote Desktop Session Host 122. This server acts as the starting point for all future session hosts and dedicated desktops and has session host role installed. In one mode, the server uses Windows Server 2016 based VM, which is highly optimized for RDS/VDI environments, and includes Office ProPlus pre-installed, but not activated. In such a mode, the Start menu, desktop, quick launch bar, background, login screen, and other user noticeable areas are highly customized for a good user experience, and the desktop experience role is installed and registry entries are added to optimize for user experience making the server OS virtually indistinguishable from a desktop OS. Unneeded services are turned off.

From a networking perspective all servers need to maintain a specific set of allowed connections between each other and the public Internet. The network consists of three zones: WAN 103, DMZ 106, and LAN 102.

Similar to the private cloud embodiment, WAN 103 is the public Internet outside of the IT environment 100.

The DMZ 106 is a limited access internal zone that houses the PRX01 Active Directory Federation Services proxy server 112 and the RDGW01 Remote Desktop Gateway server 132 servers. WAN devices are allowed to connect to the PRX01 Active Directory Federation Services proxy server 112 on port 443 to carry ADFS network to be passed to the ADFS server (the DC01 Active Directory Domain Controller 124). WAN devices are also allowed to communicate with the RDGW01 Remote Desktop Gateway server 132 on all the necessary RDP network ports to allow for desktop connectivity.

The LAN 102 is where all other servers and desktops live. No connectivity is allowed from the WAN 103 directly to the LAN 102. However, the PRX01 Active Directory Federation Services proxy server 112 can communicate with the DC01 Active Directory Domain Controller 124 for ADFS traffic on port TCP/443 and the RDGW01 Remote Desktop Gateway server 132 can communicate with the DC01 Active Directory Domain Controller 124 and the RDSH01 Remote Desktop Session Host 122.

For the public cloud hosted IT environment 100, the above described IP scheme is strictly defined as part of the template and each network and server device is assigned a static IP address. This makes it possible to properly manage the network with the Admin Portal (AP), which expects the build of the environment to follow pre-defined standards and can find the servers where expected. The chosen network needs to be large enough to accommodate sizable organization and use an IP numbering scheme reserved for private networks. In a primary example, 10.125.0.0/16 is selected for its ability to accommodate 65K devices and at the same time for being obscure enough where the chances of overlapping with a customer's existing network on-premises are pretty low. If there is an overlap the customer's network must be re numbered to use a different IP scheme. In the public cloud hosted IT environment 100, the /16 network is split up between the LAN 102 and the DMZ 106 as follows: LAN: 10.125.0.0/17, DMZ: 10.125.254.0/24.

Additionally, the public cloud hosted IT environment 100 includes a firewall. Each customer-user's individual environment has the same IP scheme, which means that the underlying routing and firewall solution must support overlapping IP ranges for multiple customers. The necessary firewall protection for the environment is created utilizing Azure's Network Security Groups. The platform is tuned to support multi-tenant management, but with maximum amount of isolation between customer-users. Additionally, each Azure account is associated with an Office 365 tenant provided by the customer (or their reseller) and Azure account.

In the public cloud hosted IT environment 100, and within the Azure account, there must be a unique subscription for the IT environment 100 and it must start out as empty. This keeps all resources of one customer-user completely isolated from others. The IT environment 100 relies on Azure's software-defined networking to isolate and protect customer-users' from each other's access.

The provisioning method 200 described above is merely one example of the processes one could use for provisioning the IT environment 100 shown in FIGS. 1A and 1B, but it is this specifically ordered combination of steps that has been found to be most efficient and effective in automating the provisioning process without requiring human intervention. Using the provisioning method 200 described above with reference to FIG. 2, the entire process can be automated without any human intervention between step 202 to step 238, then, after the system receives the number of users for the final IT environment in step 240, the process can continue without any human intervention from step 242 to step 246. If the number of users for the final IT environment is already known (or automatically collected), then the entire provisioning method 200 can be accomplished without any human intervention. In such embodiments, a controller such as the controller described further below may execute the steps of the provisioning method 200 to provision the IT environment 100.

Figure 3:
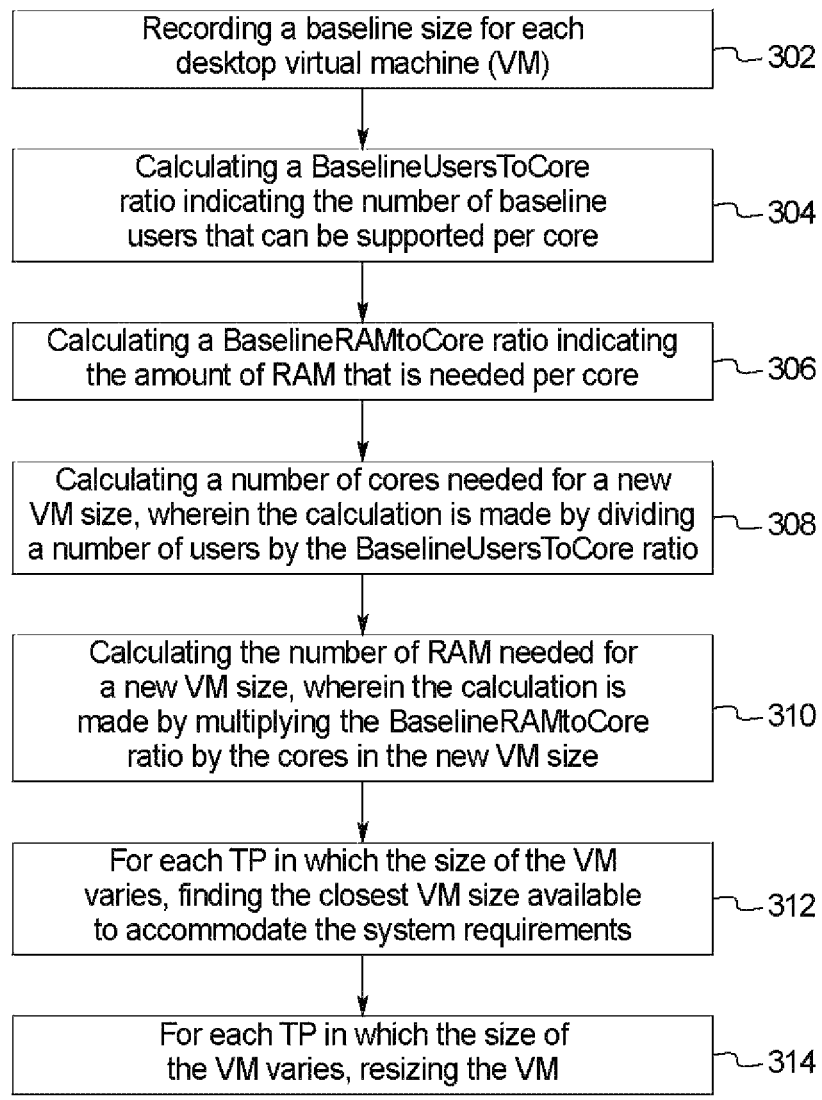
FIG. 3 is a flow chart illustrating steps in an example method of automatically scaling an IT environment.
Figure 4C:
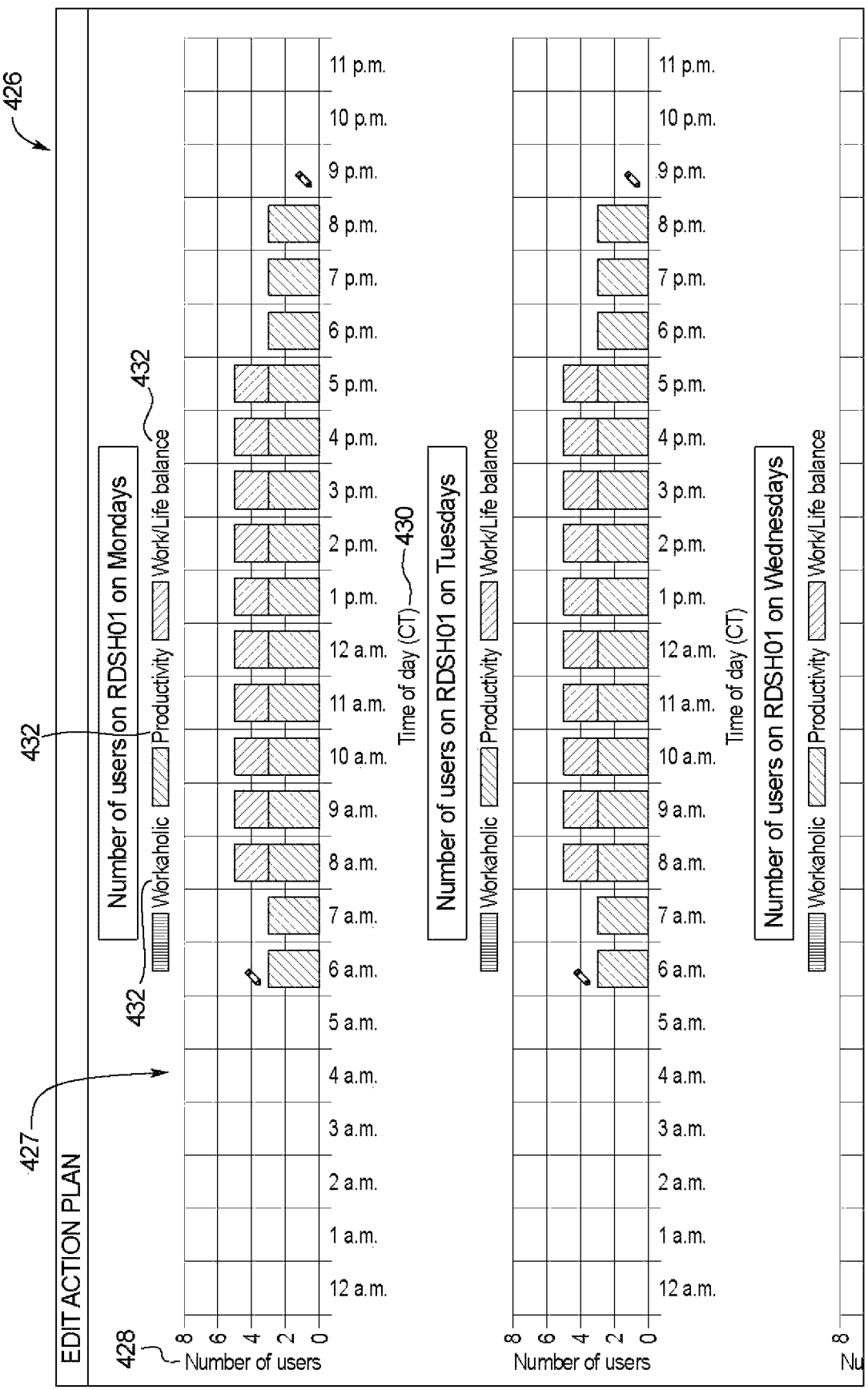

FIG. 3 is a flow chart diagramming the steps of an autoscaling method 300 for automatically scaling the IT environment 100 shown in FIGS. 1A and 1B. FIGS. 4A-4C illustrate an example of an autoscaling GUI 400 for use in the autoscaling method 300.

The execution of the autoscaling method 300 by a controller (described further herein) is referred to as the autoscaling mechism. As an overview, the autoscaling mechanism looks at the expected usage of any one particular resource (e.g., a persistent desktop) and releases its resources (i.e., powers off the resources) when no usage is expected, powers it on its resources when full usage is expected and, most importantly, resizes a resource shared by multiple users when expected usage is somewhere between no usage and full usage.

Since the autoscaling mechanism looks at expected usage of every resource in the IT environment 100 individually, it can handle the persistent desktop scenario, which is the most prevalent use-case in the real world. Additionally, as will be described further, the autoscaling mechanism is able to closely match resource size to demand, rather than just turn resources off/on.

FIG. 4A illustrates a representative example of an autoscaling GUI 400. The autoscaling GUI 400 shown is one example of a user interface through which an admin may control parameters of the autoscaling mechanism. It is understood that other autoscaling GUIs 400 other than the example shown in FIG. 4A may be used to accomplish the objects and advantages of the autoscaling method 300 and that numerous variations of the autoscaling GUI 400 will be apparent to those skilled in the art based on the teachings provide herein.

In the embodiment shown in FIG. 4A, the autoscaling GUI 400 includes: an autoscaling on/off switch 402; and a WHP module 404 including WHP adjustment controls 406, a Workaholic WHP setting 408, a Productivity WHP setting 410, and a Work/Life Balance WHP setting 412.

As shown in FIG. 4A, within the IT environment 100, the autoscaling mechanism can be, by default, disabled, which will effectively mean that all desktop VMs are left in their current size without any automatic resizing. In an embodiment, the autoscaling GUI 400 includes an autoscaling on/off switch 402 that allows the admin to turn the autoscaling mechanism on or off. When the autoscaling mechanism is turned on, additional options appear on the autoscaling GUI 400, as shown.

For example, the embodiment shown in FIG. 4A, the admin can define a Work Hours Profile (WHP) for each user using the WHP module 404. The WHP is a schedule of hours and days during which the user is expected to use the resources allocated to the user within the IT environment 100. Sample default settings are described for illustrative purposes and the associated hours can be adjusted for each of the profiles by selecting the WHP adjustment control button 406.

In the example shown in FIG. 4A, the first profile setting is the Workaholic WHP setting 408. In the example, the Workaholic WHP setting 408 is the default profile and assumes that a user must have access to his or her resources at all times. Other profile examples shown include a Productivity WHP setting 410, which, when selected, enables the user to have access to his or her resources Monday-Saturday between 6:00 AM-9:00 PM, and a Work/Life Balance WHP setting 412, which, when selected, enables the user to have access to his or her resources Monday-Friday between 8:00 AM-6:00 PM.

Additionally, each of these WHP settings can be modified by selecting the using the WHP adjustment control button 406, which leads to the Edit Desktop Auto-Scale Profile GUI 414 shown in FIG. 4B. The Edit Desktop Auto-Scale Profile GUI 414 enables the admin to select different days and hours for which the user is able to access the dedicated resources for any one or more of the WHP settings. The user can edit the description 416 and select the work days 418, the starting work hour 420, and the ending work hour 422 for this particular WHP. The admin can also identify which users are designated for the respective WHP profile in the user input field 424.

Within the IT environment 100, an admin may group each user with others into given WHPs. Each user can only be in a single WHP at a time, whether user-selected or admin directed. In a primary example, when the IT environment is first established, all of the users are assigned into the Workaholic WHP setting 408. However, after the initial assignment, either the admin or the user may move the user's resources to another WHP.

In the example shown in FIG. 4A, there are three primary, and adjustable, WHPs. However, it is understood that there may be any number of WHPs including an individual WHP for each user.

The autoscaling GUI 400 also provides an action plan button 425 that leads to an action plan user interface 426 as shown in FIG. 4C. The action plan user interface 426 provides an action plan 427 that is generated for each virtual machine (VM) based on the WHP for each user's resources. The action plan 427 includes a daily schedule graphically presented to the admin illustrating the number of users 428 accessing the resources at any given time 430 according to their respective WHPs 432. In some embodiments, the action plan 426 includes action options associated with a specific time period (TP). The admin has the ability to select any action at any TP and modify the action (e.g., actions may include: no change, return to baseline, off/on, etc.).

Thus, when the autoscaling mechanism is enabled, a new action plan 427 is generated whenever one of the following happens: the number of users assigned to a VM changes; the WHP user membership changes (e.g., new user created, user moved from one WHP to another, user is deleted); one or more of the WHP's associated schedule changes (e.g., the Productivity WHP setting 410 changes to M-Sa 7:30 AM to 6:30 PM); the baseline size of any desktop VM changes (e.g., the RDSH01 Remote Desktop Session Host 122 is increased in size); a new or modified WHP is created; input from the testing method 700 suggests or implements a change to the action plan 427, etc. When the action plan 427 indicates there are varied demands for VM size, the autoscaling mechanism employs the autoscaling method 300 to automatically resize the VM to optimal size at each TP.

Turning back to FIG. 3, the autoscaling method 300 includes the following steps.

Step 302: recording a baseline size for each desktop VM.

Step 304: calculating a BaselineUsersToCore ratio indicating the number of baseline users that can be supported per core.

Step 306: calculating a BaselineRAMtoCore ratio indicating the amount of RAM that is needed per core.

Step 308: calculating a number of cores needed for a new VM size, wherein the calculation is made by dividing a number of users by the BaselineUsersToCore ratio. For example, when calculating the number of cores needed for a new size of twenty off-peak users wherein the BaselineUsersToCore ratio is five, the IT environment 100 needs a VM with four cores.

Step 310: calculating the number of RAM needed for a new VM size, wherein the calculation is made by multiplying the BaselineRAMtoCore ratio by the cores in the new VM size. For example, when there are four cores needed with a BaselineRAMtoCore of 3.5 GB RAM, a VM with 14 GB RAM is needed.

Step 312: for each TP in which the size of the VM varies, finding the closest VM size available to accommodate the system requirements. For example, finding the closest VM size available to accommodate the system requirements may include finding a VM in the same series—If the customer started out with 40 users on D4v2 (8C/28 GB) for $773/month and off-peak usage is 20 users, a VM closest to four cores and 14 GB of RAM is needed, which is D3v2 (4C/14GB) for $309/month.

Step 314: for each TP in which the size of the VM varies, resizing the VM. With the example used herein, once an action plan is generated, it is submitted for automation by way of the autoscaling method 300. For each TP in which the size of the VM varies, the action plan is converted into the following scheduler actions: at each TP minus a predetermined buffer (e.g., 5:15 PM minus 2 minutes) do the following: (1) send a message to all users on each affected VM that the system will be going down for maintenance, (2) at TP shut down the VM, (3) change its size, and (4) power it back up. Tasks should be parallelized so all affected VMs can be shut down and started back up concurrently. Additionally, if there are no users that need access to a VM at a given TP then the TP size is 0 or "OFF" at that TP.

Also, VDI desktops that are dedicated to each individual user (as opposed to RDSH desktop servers, which are shared by multiple users) can only have a size of either baseline size (meaning original size—no action) or OFF since there is only one user associated with that VM.

As shown, the autoscaling method 300 and the an autoscaling GUI 400 enable customer-users and/or admin-users to implement a user-adjustable schedule for the automatic release of resources (i.e., powering off of the resources) in the IT environment 100 when no usage is expected, powering on resources in the IT environment 100 when full usage is expected and, most importantly, resize resources shared by multiple users when expected usage is somewhere between no usage and full usage. This autoscaling mechanism optimizes the resource demand and can be used to optimize the cost of the IT environment 100.

As described above, the provisioning of an IT environment 100 such as the ones described with respect to FIG. 1A and FIG. 1B is a complex task with numerous interconnected steps. As a result, estimating the actual costs of provisioning the entire IT environment 100 can be pretty complex; in fact, many managed service providers (MSPs) find it difficult to calculate the true costs of the IT environment 100 until after it is provisioned and deployed (and invoiced). The costs of some portions of the IT environment may be easier to calculate than others (e.g., Microsoft offers an Azure Calculator to assist with some aspects of IT environment provisioning cost calculations), but MSPs still need to have a solid understanding of all the inputs in order to make the output relevant. One common issue with IT environment provisioning cost calculations is that while some of the elements of the IT environment 100 are more obvious to identify as part of the calculation (e.g., virtual machines, storage, databases, etc.), MSPs often fail to account for additional required elements such as third-party software licenses (e.g., Microsoft Office 365, which isn't even included in the Microsoft Azure pricing calculator), remote desktop servers, client access licenses, etc. In addition, MSPs often fail to account for the "plumbing" aspects of the IT environment 100, such as, for example, bandwidth, disk I/O, storage costs.

Another issue with IT environment provisioning cost calculations is that they typically are calculated as a total monthly or annual cost number. While ultimately important, reporting the costs in this way doesn't tell the whole story. The cost calculator taught herein estimates the costs of running a cloud-based IT environment 100 and takes into account all of the factors noted above. In addition, it provides real-time costs as users enter various data points, which allows user to create "what-if?" scenarios to explore options for provisioning the IT environment 100. Further, the cost calculator can generate cost information in multiple currencies and provide the per user per month in addition to generating a total monthly or annual cost.

Figure 5A:
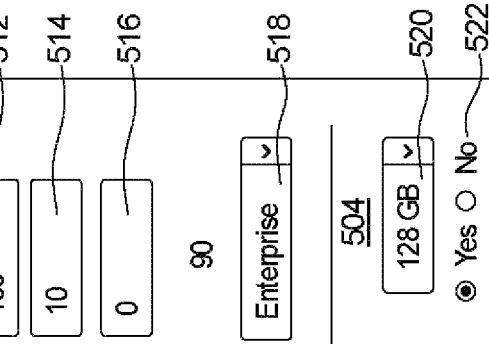

FIGS. 5A-5C illustrate an example of an IT environment provisioning cost calculator GUI 500. In the illustrated example, the IT environment provisioning cost calculator GUI 500 includes a desktop information section 502, a server section 504, an Office 365 and remote desktop server section 506, an other features section 508, and a cost assumptions section 510. In other embodiments, the information maybe categorized into other groupings.

In the desktop information section 502, the IT environment provisioning cost calculator GUI 500 provides input fields for the total number of users needing the desktop 512, the number of users needing dedicated VDI desktops 514, and the number of users needing graphic intensive desktops 516. The cost calculator then recommends a plan 518 (e.g., recommended configuration) based on inputs 512-516. In the illustrated embodiment, the user is able to override the recommended plan 518 to select a different plan if desired.

In the server section 504, the IT environment provisioning cost calculator GUI 500 provides input fields for the amount of storage space required for shared files and database 520 and a yes or no button 522 for whether there will be any applications or databases that require dedicated servers. If the user selects "yes" for the button 522, then the IT environment provisioning cost calculator GUI 500 provides selection options for specific aspects related to each dedicated server. The options include the instance size 524, the type of OS disk 526, and type of the data disk 528. Additional dedicated servers maybe added by selecting the "add another" button 530.

In the Office 365 and remote desktop server section 506, the IT environment provisioning cost calculator GUI 500 provides input fields for the number of Office 365 licenses 530 and whether the user will purchase RDS licenses 532.

In the other features section 508, the IT environment provisioning cost calculator GUI 500 lists a number of optional features and provides a button for each feature for the user to designate whether the feature is to be included in the package. The button may be a yes or no button or may include optional time durations. In the illustrated example, the listed features include the hybrid usage benefit (HUB) 534, the desktop auto-scale 536, in-region backup 538, reserved instances 540, out-of-region DR 542, on-ramp regions 544, and performance monitoring 546.

In the cost assumptions section 510, the IT environment provisioning cost calculator GUI 500 identifies certain cost assumptions that are made in the calculations. A cost, numerical value, or number of options is automatically provided or selected for each assumption, and the user can modify the assumption if desired. In the illustrated embodiment, the list of assumptions includes the following: bandwidth 548, storage access 550, users to CPU Core ration (RDSH) 552, users to CPU Core ratio (RDSH with GPU) 554, Azure CSP discount 556, Office 365 CSP discount 558, Azure region 560, and currency 562.

The example IT environment provisioning cost calculator GUI 500 is merely one example of a IT environment provisioning cost calculator GUI 500 that may be used to meet the objectives and advantages described herein.

Figure 6A:
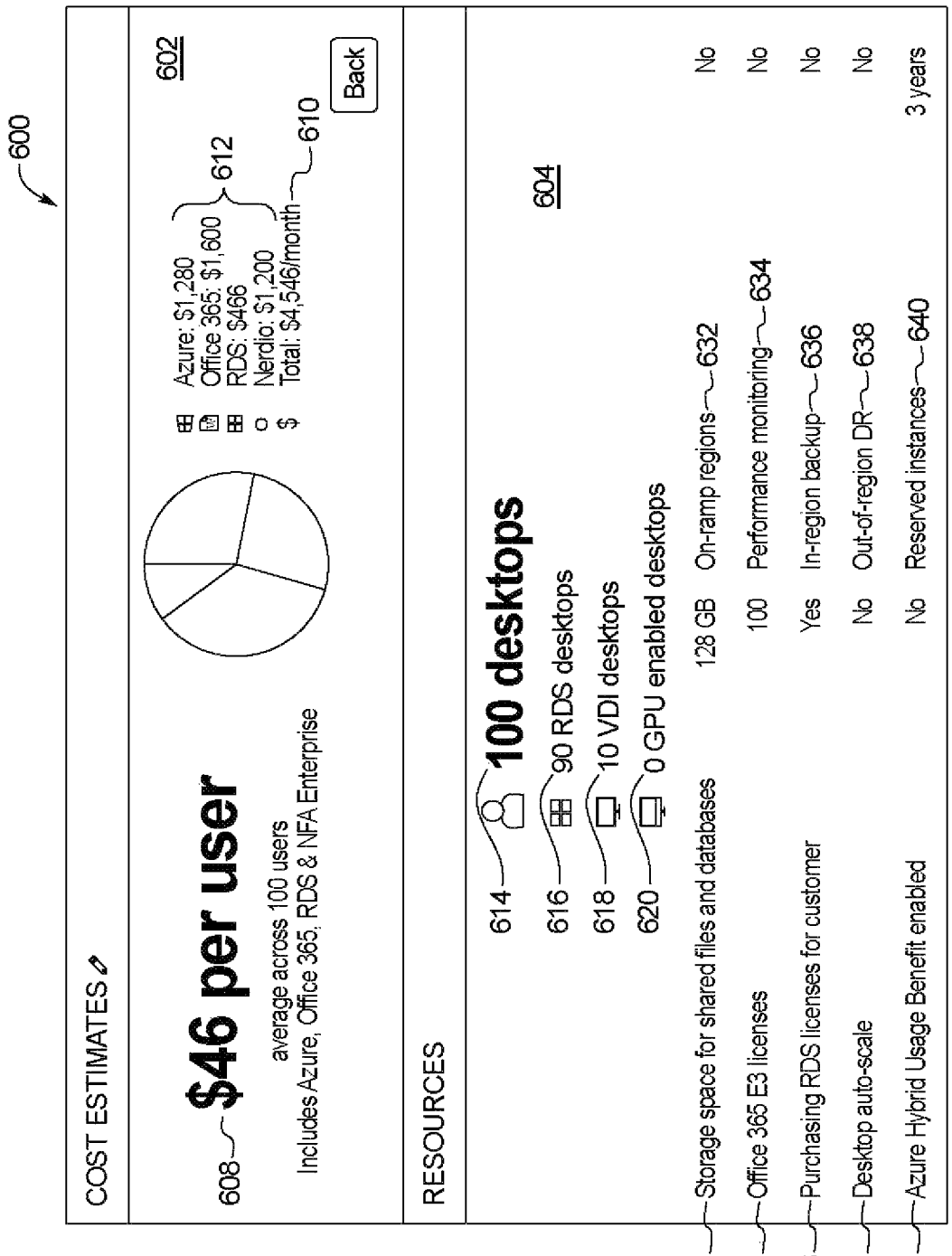
Figure 6B:
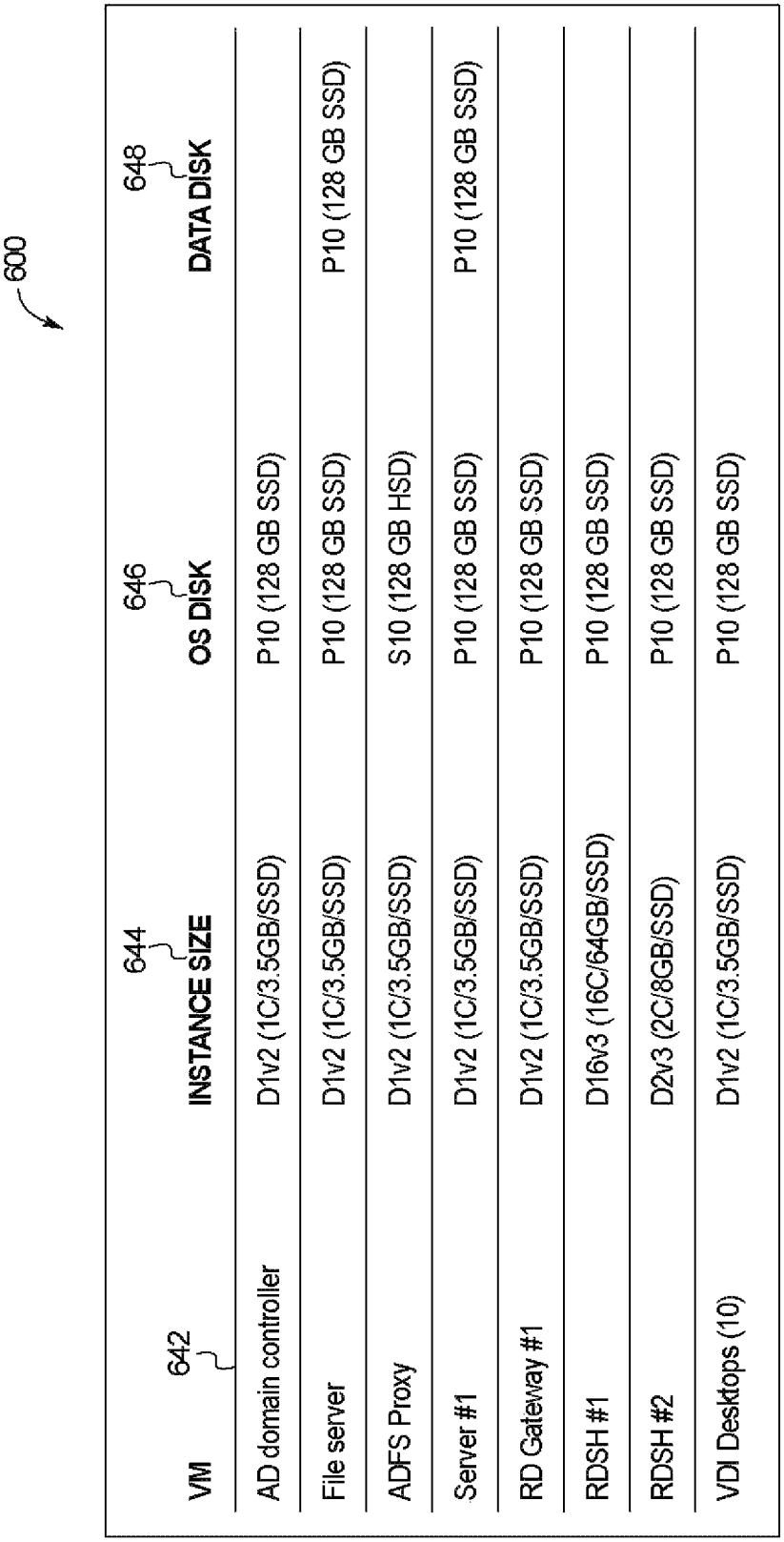

FIGS. 6A-6C illustrate an example of an IT environment provisioning cost calculator output GUI 600. In the illustrated embodiment, the IT environment provisioning cost calculator output GUI 600 includes a summary section 602, a resources section 604, and a cost breakdown section 606. The summary section 602 provides an estimate of the average monthly cost per user 608 and the total cost per month 610 as well as the costs per month for various constituent parts 612, such as, for example, the costs for Azure, Office 365, RDS, and Nerdio.

The resources section 604 lists the components of the system and other details relevant to pricing. In the example shown, the number of desktops 614 is provided, breaking the total down into RDS desktops 616, VDI desktops 618, and GPU-enabled desktops 620. The IT environment provisioning cost calculator output GUI 600 then provides details such as the amount of storage space needed for shared files and databases 622, the number of Office 365 licenses 624, and whether RDS licenses are being purchased 626. It also indicates whether the desktop auto-scale feature is activated 628, the Azure HUB is enabled 630, on-ramp regions are provided 632, performance monitoring is provided 634, in-region backup is provided 636, out-of-region DR is provided 638, and provides the time duration for reserving instances 640. Finally, the IT environment provisioning cost calculator output GUI 600 includes details relating to each identified dedicated server 642, including the instance size 644, the OS disk 646, and the data disk 648.

Referring to FIG. 6C, the cost breakdown section 606 provides a total cost estimate 650 and a summary of cost estimates 652 for various aspects of the package, including select individual components such as desktops, server storage, and bandwidth. The summary also identifies savings and discounts.

As shown, the IT environment provisioning cost calculator GUI 500 and the IT environment provisioning cost calculator output GUI 600 work together to enable users to correctly identify all of the costs that go into a proper calculation of the expenses of the IT environment 100 and review the results with meaningful breakouts, including real-time calculations for: the total cost per month 610; the average monthly cost per user 608, and the costs per month for various constituent parts 612.

Figure 7:
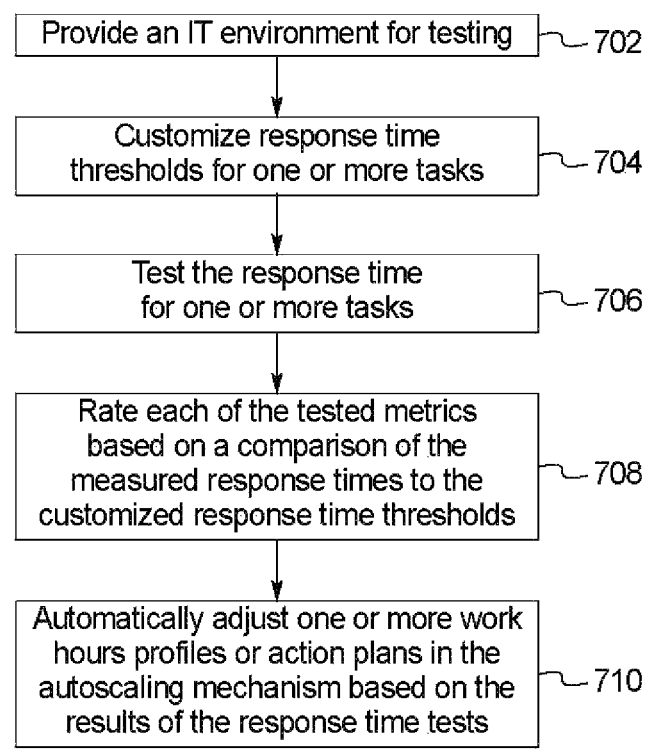
FIG. 7 is a flow chart illustrating steps in an example method of testing an IT environment.

FIG. 7 is a flow chart diagramming the steps of a testing method 700 for testing the IT environment 100. In a preferred embodiment, the IT environment testing method 700 uses visual synthetic monitoring to mimic end-user interaction flows in the IT environment 100. The testing method 700 actually uses the desktops and applications in the IT environment 100 to test key dimension of the user experience. As such, the testing method 700 measures performance of the IT environment 100 from the edge—that is, where the end user is located—and not simply from within the cloud itself. This user-centric approach is meaningful in that it is not simply about CPU usage or disk IOPs, it is focused on what the user experiences and perceives as performance.

In the example used herein, the IT environment testing method 700 automatically performs tests for key dimensions of the user experience on an hourly basis and reports the response times for each type of service. In one example, these tests include: logging in to the desktop, visiting a website using a primary web browser, visiting a website using a secondary web browser, sending an email via an email client, opening a word-processing document, opening a presentation software document, and opening a PDF document.

In an important feature of the testing method 700, IT administrators can customize thresholds for each of these tests against which the testing method 700 will report service as good, fair, or poor.

While there are many different types of IT monitoring, the advanced end-user testing employed in the testing method 700 provides more meaningful feedback because it measures actual, real-time performance where it really counts. Not only does this enable IT administrators to be proactive and prevent issues before they derail the organization, but the data compiled in the testing method 700 may be used to feed informative data points into the autoscaling method 300, which in turn enables dynamic and automated scaling of computer resources based on measured real usage trends.

The IT environment testing method 700 shown in FIG. 7 helps to solve real-world problems including loss of productivity and efficiency due to IT latencies. So many organizations rely on their employees' ability to rapidly and reliably access email, applications, web, and other business-critical IT components. Any problems in these areas are a huge blow to productivity. Without proactive monitoring, administrators may spend more time troubleshooting and trying to pinpoint problems than actually fixing the problems.

As shown, the steps of the IT environment testing method 700 shown in FIG. 7 include:

First step 702: provide an IT environment 100 for testing. The IT environment 100 may be, for example, one of the IT environments 100 described with reference to FIGS. 1A and 1B into which a testing server 800 (FIG. 8) has been incorporated.

Second step 704: customize response time thresholds for each of the following tasks: logging in to a desktop; visiting a website using a web browser; sending an email via an email client; opening a word-processing document; opening a spreadsheet document; opening a presentation software document; and opening a PDF document, wherein the customized response time thresholds include at least a first threshold for a first rating and a second threshold for a second rating. There may be any number of threshold ratings delineating the performance of the system. For example, there may be three separate thresholds indicating good, fair, or poor performance of the functions within the IT environments 100.

Third step 706: test the response time for each of the following tasks: logging in to a desktop; visiting a website using a web browser; sending an email via an email client; opening a word-processing document; opening a spreadsheet document; opening a presentation software document; and opening a PDF document.

Fourth step 708: rate each of the tested metrics based on a comparison of the measured response times to the customized response time thresholds.

Fifth step: automatically adjust one or more work hours profiles or action plans in the autoscaling mechanism based on the results of the response time tests.

The examples provided with reference to FIG. 7 are illustrative of user-centric testing of the IT environment 100 in a way that provides meaningful analysis of the user experience. It is contemplated that the IT environment testing method 700 may be adapted to test any end-user tasks indicative of system performance, most particularly end-user system performance.

As described above, the third step 706 includes testing the response time for each of the following tasks: logging in to a desktop; visiting a website using a web browser; sending an email via an email client; opening a word-processing document; opening a spreadsheet document; opening a presentation software document; and opening a PDF document. The following is an example of a system and method for automating the testing process.

Figure 8:
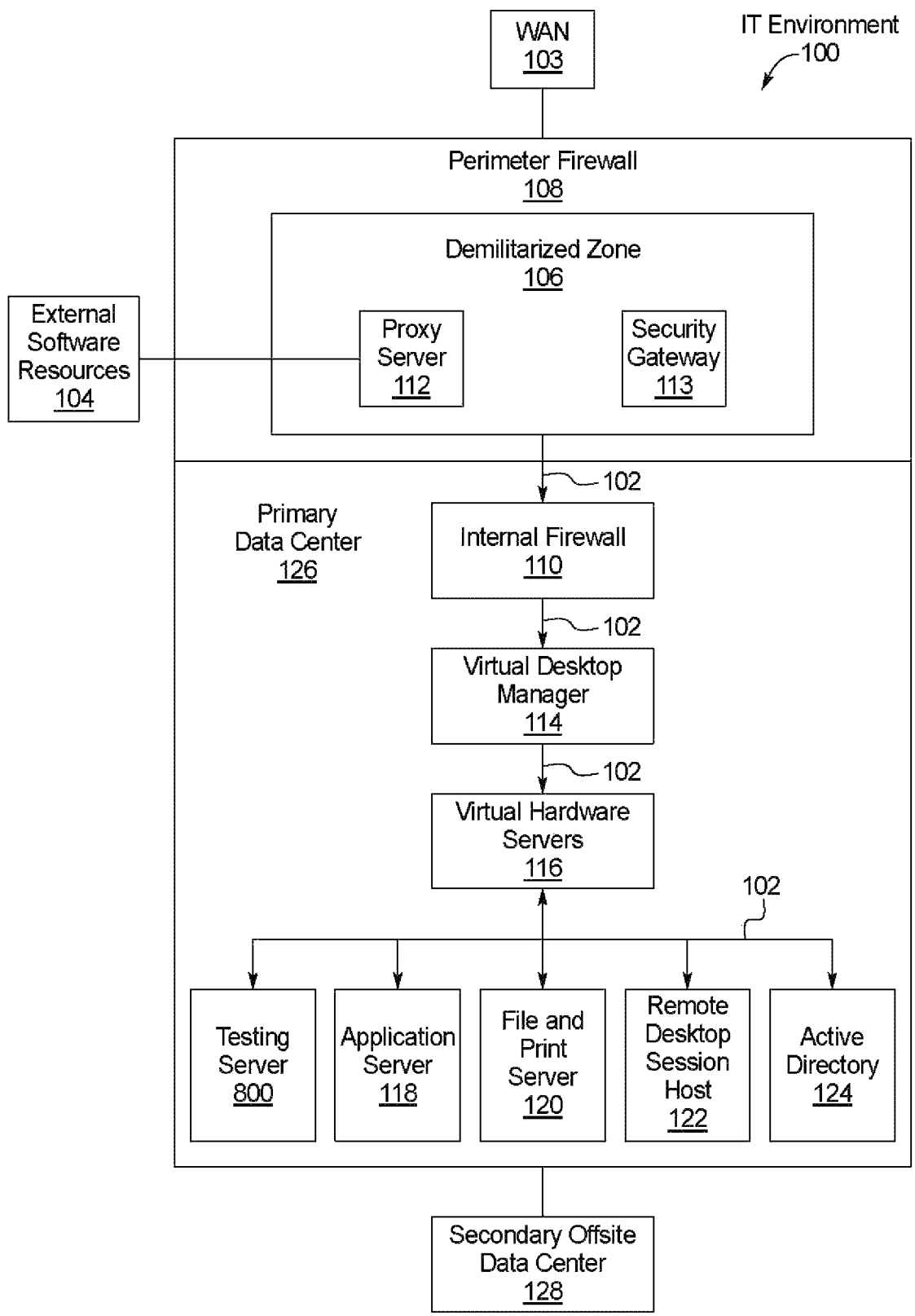
FIG. 8 is an example of a private cloud hosted IT environment including a testing server.

To automate the testing procedure, a script may run on a dedicated VM. The dedicated VM is referred to herein as a probe VM. FIG. 8 is an example of an IT environment 100 in which testing server 800 hosts the probe VM. Although shown as an embodiment in a privately hosted cloud environment, it is understood that the testing server 800 may be used in any IT environment 100, whether publicly or privately hosted. When a user enables the testing method 700 within the IT environment 100, the controller spins up a probe VM in the testing server 800. In a primary example, the probe VM includes a testing script that runs hourly, though it is understood the testing frequency can vary between embodiments. This testing script expects one or more remote desktop protocol (RDP) files in a specific folder. Therefore, the automation of the testing method 700 includes the generation of a RDP file for each of the RDSH servers and each of the VDI desktops that is then placed in the specific folder in which the probe VM will look for them. The script further directs the probe VM to store its results to a SQL database. The data in the SQL DB is then used to show info in an associated GUI. Because the operation of the probe VM is dependent on the appropriate RDP file being stored in the folder in which the probe VM expects, when a user adds or removes a RDSH server or a VDI user, the system must correspondingly add or remove the appropriate RDP file.

When a user turns performance monitoring OFF from the associated GUI (provided, for example, by controller 900 described in more detail with reference to FIG. 9), the system destroys the probe VM and the automatic testing is suspended.

The following is a description of various features and functions for one example of the probe VM that may be used to automatically test the IT environment 100.

The probe VM (i.e., ProbeVM) is configured with a fixed console resolution so when the probe runs visual tests, the position of various elements on the screen are predictably placed.

The ProbeVM is configured for auto-login using a predefined system account designated for performance testing. Every time the ProbeVM reboots, it automatically logs in using this account.

There is a scheduled task configured on the ProbeVM that is triggered on login of the testing system account. In this example, the test is scheduled to run every 60 minutes after the initial login and repeat indefinitely. The schedule may be varied to run more or less frequently and the individual tests may be run an equal or unequal number of time to best meet the testing needs in the system.

When executed (in this example, hourly), the scheduled task runs a batch script that loops through RDP (i.e., remote desktop protocol) connection files located in a designated folder. The RDP connection files may be, for example, generated in an administrative portal when a new user desktop is added to the IT environment 100 and removed when desktops are removed from the IT environment 100.

Each RDP file is launched by the script that is triggered by the scheduled task. A visual synthetic monitoring agent (such as the one marketed under the brand name Alyvix) launches a remote desktop connection and starts running a "test case". Each test case is configured to run through the tests in sequence and to time and record how long each test takes to complete.

For instance, the first test times how long it takes for the icons to appear on the screen of the remote desktop after the time the password is typed into the connection window. In this example, the visual synthetic monitoring agent has a predefined user account called PerfTestUser with a predefined password. When a login prompt comes up, the login prompt is detected and the visual synthetic monitoring agent login credentials are submitted. This is the start of the test timer. The test timer ends when certain expected icons appear on the screen.

After the login time test, the visual synthetic monitoring agent triggers a run command that launches Internet Explorer (or other browser) and browses to a predefined web site. Once a predefined visual element is detected on this destination web site, the test is complete, the test time is recorded, and the visual synthetic monitoring agent moves on to the next test. Similar methodology is used for each of the subsequent tests.

In the real-world testing environment, there are inconsistent situations that can arise while the tests are running. For instance, one of the third-party program software suites may need to be re-activated by logging in with the appropriate username and password. The visual synthetic monitoring agent detects such irregularities and can determine that what has appeared on the screen is a login screen (instead of an expected visual element) and the ProbeVM knows to submit the username and password to activate the third-party software (e.g., Office). Accordingly, the testing server 800 must include sufficient details and credentials to overcome routine inconsistent circumstances without flagging each as a system failure or other performance issue.

In the embodiment shown in FIG. 8, each of ProbeVM's timed test results, as well as the accompanying screenshots, are stored in a local SQL database on the testing server 800. In this example, Microsoft's Network Access Protection Client Agent (NAP) periodically pulls the information from the SQL DB on the testing server 800 (e.g., every hour). If NAP detects that no recent information is available in the SQL DB or NAP is unable to connect to the testing server 800 for three hours, NAP triggers a reboot of the ProbeVM. This causes the VM to auto login, start the schedule task, and go through the process again.

As noted above, the testing data compiled in the SQL DB on the testing server 800 may be used to automatically adjust one or more work hours profiles or action plans in the autoscaling mechanism. In one example, the autoscaling mechanism can poll the database in the testing server 800 to identify time periods in which performance consistently lags behind desired performance levels. The action plan may then be fine-tuned to improve system resource availability at those identified time periods. Such feedback data from the testing server 800 may also help refine the timing of one or more of the WHPs. For example, the test results over time may show that there is consistently poor performance immediately after one of the autoscaling events in the action plan 427 (e.g., a downsizing of system resources at 5:00 PM on a Wednesday afternoon). Such detail may help to indicate that the autoscaling event in the action plan 427 should be shifted to better accommodate real-life usage of the IT environment 100 (e.g., delay the downsizing of system resources until 5:30 PM on Wednesdays).

As mentioned above, aspects of the systems and methods described herein are controlled by one or more controllers. The one or more controllers may be adapted to run a variety of application programs, access and store data, including accessing and storing data in the associated databases, and enable one or more interactions as described herein, including the execution of the methods and other features described above. Typically, the controller is implemented by one or more programmable data processing devices. The hardware elements, operating systems, and programming languages of such devices are conventional in nature, and it is presumed that those skilled in the art are adequately familiar therewith.

Figure 9:
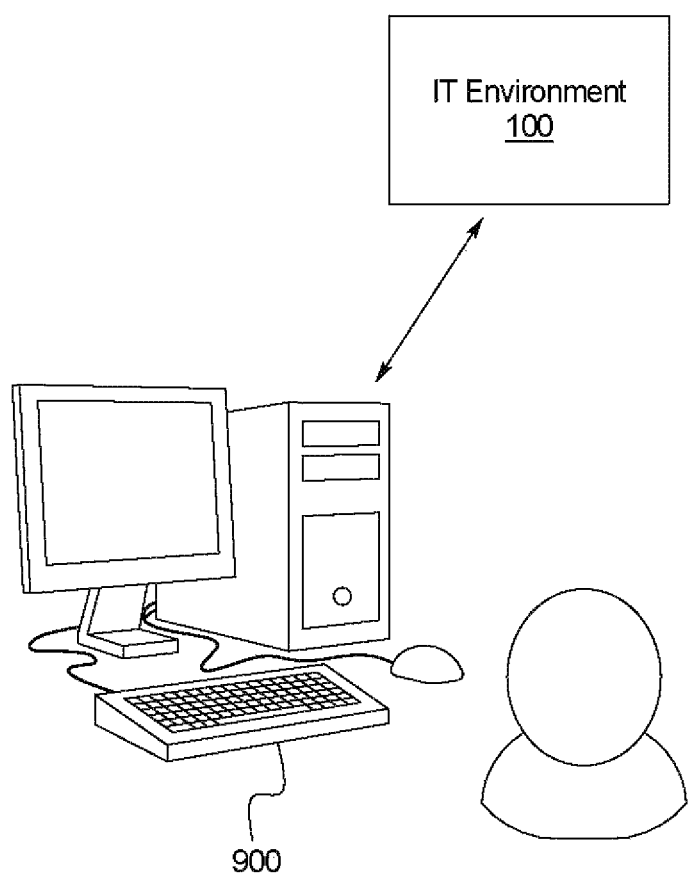
FIG. 9 is a schematic representation of a controller interacting with an IT environment to carry out the various features and functions described herein.

FIG. 9 is a schematic representation of a controller 900 in communication with the IT environment 100. In the example shown in FIG. 9, the one or more controllers 900 may be a PC based implementation of a central control processing system utilizing a central processing unit (CPU or processor), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers 900 may also include one or more input/output interfaces for communications with one or more processing systems. One or more such interfaces may enable communications via a network, e.g., to enable sending and receiving instructions electronically. The communication links may be wired or wireless.

The one or more controllers 900 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller 900. For example, the one or more controllers 900 may include a graphics subsystem to drive the output mechanism. The links of the peripherals to the system may be wired connections or use wireless communications.

Although summarized above as a PC-type implementation, and shown as such in FIG. 9, those skilled in the art will recognize that the one or more controllers 900 also encompasses systems such as host computers, servers, workstations, network terminals, and the like, particularly those shown in FIGS. 1A and 1B. Further, one or more controllers 900 may be embodied in a device, such as a mobile electronic device, like a smartphone or tablet computer. In fact, the use of the term controller 900 is intended to represent a broad category of components that are well known in the art. As such, it is recognized that the use of the term controller 900 may refer to a PC-type implementation communicating with the IT environment 100 as shown in FIG. 9 or may be any one or more of the servers or resources in the IT environment shown in FIGS. 1A and 1B, as will be understood by those skilled in the art based on the teachings provided herein.

Aspects of the systems and methods provided herein encompass hardware and software for controlling the relevant functions. Software may take the form of code or executable instructions for causing a controller 900 or other programmable equipment to perform the relevant steps, where the code or instructions are carried by or otherwise embodied in a medium readable by the controller 900 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A system that automatically scales the size of a virtual machine in a cloud-based IT environment that is hosting one or more active user sessions, the system comprising:
a virtual machine having a plurality of incrementally scalable sizes, wherein each size is defined by a number of virtual CPU cores;
a controller controlling the size of the virtual machine;
a memory in communication with the controller, wherein the memory is configured to store program instructions executable by the controller;
wherein, in response to executing the program instructions, the controller is configured to:
receive a baseline implemented size of the virtual machine supporting a first number of user sessions;
receive a request to resize the virtual machine to a new implemented size supporting a new number of user sessions;
in response to the request to resize the virtual machine, using a user sessions to core ratio, wherein the user sessions to core ratio is defined as the number of user sessions that can be supported per virtual CPU core, calculate a minimum number of virtual CPU cores needed to support the new implemented size;
in response to the calculation of virtual CPU cores, and without user intervention, identify one of the plurality of incrementally scalable sizes for the virtual machine that comprises at least the minimum number of virtual CPU cores needed to support the new number of user sessions, wherein each of the plurality of incremental sizes is preconfigured with each incremental size comprising a set number of virtual CPU cores and a corresponding set amount of resources for the set number of virtual CPU cores;
notify each of the one or more active user sessions of the resize time; and
shut down each of the active user sessions and resize the virtual machine to the identified one of the plurality of incrementally scalable sizes for the virtual machine.

2. The system of claim 1, wherein the request to resize the virtual machine to the new size supporting the new number of user sessions is derived from an action plan comprising a schedule of a plurality of users scheduled to access the virtual machine at any given time.

3. The system of claim 2, wherein the action plan is automatically generated by a composition of a plurality of work hours profiles, each work hours profile comprising a user adjustable schedule of when an associated user is expected to use the virtual machine.

4. The system of claim 3, wherein each work hours profile is adjustable through a user adjustable graphical user interface.

5. The system of claim 1, wherein the request to resize the virtual machine to a new size supporting the new number of user sessions is triggered by the output of a testing server.

6. The system of claim 5, wherein the output of the testing server automatically adjusts an action plan comprising a schedule of a plurality of users scheduled to access the virtual machine at any given time, and the request to resize the virtual machine to a new size supporting the new number of user sessions is derived from the action plan.

7. The system of claim 5, wherein the output of the testing server automatically adjusts at least one work hours profile comprising a user adjustable schedule of when an associated user is expected to use the virtual machine, wherein the adjustment of the at least one work hours profile modifies an action plan comprising a schedule of a plurality of users scheduled to access the virtual machine at any given time, and the request to resize the virtual machine to a new size supporting the new number of user sessions is derived from the action plan.

8. The system of claim 5, wherein the testing server:
spins up a test user session in the testing server;
on a scheduled routine, through the test user session, identifies a plurality of response times for a plurality of tasks in the virtual machine;
compares the identified plurality of response times against defined response time thresholds; and
when one or more of the identified plurality of response times exceeds the defined response time thresholds, provides a request to the first server to resize the virtual machine to a new implemented size supporting a new number of user sessions.

9. The system of claim 8, wherein the testing server tests the user session to identify the plurality of response times for the plurality of tasks in the virtual machine according to a scheduled routine.

10. The system of claim 8, wherein the testing server tests the user session to identify the plurality of response times for the plurality of tasks in the virtual machine each time the virtual machine is resized.

11. The system of claim 8, wherein the defined response time thresholds are user adjustable.

12. The system of claim 8, wherein the plurality of tasks in the virtual machine include one or more of: logging in to a desktop; visiting a website using a web browser; sending an email via an email client; opening a word-processing document; opening a spreadsheet document; opening a presentation software document; and opening a PDF document.

13. A method for automatically scaling a virtual machine in a cloud-based IT environment that is hosting one or more active user sessions including: a virtual machine having a plurality of incrementally scalable sizes, wherein each size is defined by comprising a number of virtual CPU cores; a controller controlling the size of the virtual machine; a memory in communication with the controller, wherein the memory is configured to store program instructions executable by the controller, the method comprising the steps of:
in response to executing the program instructions, receiving in the controller a baseline implemented size of the virtual machine supporting a first number of user sessions including a first number of virtual CPU cores;
receiving in the controller a request to resize the virtual machine to a new implemented size supporting a new number of user sessions;
in response to the request to resize the virtual machine, using a user sessions to core ratio, wherein the user sessions to core ratio is defined as the number of user sessions that can be supported per virtual CPU core, calculating by the controller a minimum number of virtual CPU cores needed to support the new implemented size by multiplying the user sessions to core ratio by the new number of user sessions;
in response to the calculation of virtual CPU cores, and without user intervention, identifying by the controller one of the plurality of incrementally scalable sizes for the virtual machine that comprises at least the minimum number of virtual CPU cores needed to support the new number of user sessions, wherein each of the plurality of incremental sizes is preconfigured with each incremental size comprising a set number of virtual CPU cores and a corresponding set amount of resources for the set number of virtual CPU cores;

notify each of the one or more active user sessions of the resize time; and shut down each of the active user sessions and resize the virtual machine to the identified one of the plurality of incrementally scalable sizes for the virtual machine.

14. The method of claim 13, wherein the request to resize the virtual machine to the new implemented size supporting the new number of user sessions is derived from an action plan comprising a schedule of a plurality of users scheduled to access the virtual machine at any given time.

15. The method of claim 14, wherein the action plan is automatically generated by a composition of a plurality of work hours profiles, each work hours profile comprising a user adjustable schedule of when an associated user is expected to use the virtual machine.

16. The method of claim 15, wherein each work hours profile is adjustable through a user adjustable graphical user interface.

17. The method of claim 11, wherein the request to resize the virtual machine to a new implemented size supporting the new number of user sessions is triggered by the output of a testing server.

18. The method of claim 17, wherein the output of the testing server automatically adjusts an action plan comprising a schedule of a plurality of users scheduled to access the virtual machine at any given time, and the request to resize the virtual machine to a new size supporting the new number of user sessions is derived from the action plan.

19. The method of claim 17, wherein the testing server:
spins up a test user session in the testing server;
on a scheduled routine, through the test user session, identifies a plurality of response times for a plurality of tasks in the virtual machine;
compares the identified plurality of response times against defined response time thresholds; and
when one or more of the identified plurality of response times exceeds the defined response time thresholds, provides a request to the first server to resize the virtual machine to a new implemented size supporting a new number of user sessions.

20. The method of claim 19, wherein the defined response time thresholds are user adjustable.

* * * * *